United States Patent [19]
Sannohe et al.

[11] Patent Number: 5,795,047
[45] Date of Patent: Aug. 18, 1998

[54] PROJECTION LENS AND PROJECTION DISPLAY APPARATUS

[75] Inventors: Shinya Sannohe; Yoshito Miyatake, both of Neyagawa, Japan

[73] Assignee: Matsushita Electric Industrial Co., Ltd., Kadoma, Japan

[21] Appl. No.: 568,473

[22] Filed: Dec. 7, 1995

[30] Foreign Application Priority Data

Dec. 9, 1994 [JP] Japan .................. 6-306100

[51] Int. Cl.$^6$ ................... G03B 21/14
[52] U.S. Cl. ................. 353/81; 353/34; 359/650
[58] Field of Search ................. 353/20, 31, 34, 353/100, 101, 102, 81; 349/5, 8, 9; 359/669, 678, 686, 650

[56] References Cited

U.S. PATENT DOCUMENTS

| | | | |
|---|---|---|---|
| 4,191,456 | 3/1980 | Hong et al. | 353/31 |
| 5,218,480 | 6/1993 | Moskovich | 359/753 |
| 5,390,048 | 2/1995 | Miyatake et al. | 359/650 |
| 5,400,093 | 3/1995 | Timmers | 353/101 |
| 5,404,175 | 4/1995 | Nagae et al. | 348/751 |
| 5,597,222 | 1/1997 | Doany et al. | 353/33 |

FOREIGN PATENT DOCUMENTS

| | | |
|---|---|---|
| 2167517 | 6/1990 | Japan . |
| 5224120 | 9/1993 | Japan . |
| 6130293 | 5/1994 | Japan . |

*Primary Examiner*—William Dowling
*Attorney, Agent, or Firm*—Renner, Otto, Boisselle & Sklar, P.L.L.

[57] ABSTRACT

A projection lens includes sequentially from a screen side a first lens group which has a negative power, a second lens group which has a weaker power than that of the first lens group, a third lens group which has a positive power, a fourth lens group which has a positive power, and at least one transparent prism, wherein the fourth lens group is placed on the third lens group side of the transparent prism so as to be close to or in contact with the transparent prism. In the projection lens, a back focus of the main lens group is much longer compared with a focal length. A projection display apparatus using this projection lens is composed of one main lens group, three auxiliary lenses, and three polarizer-beam splitters, and a color combining optical system for combining three primary color components of red, green, and blue into one light beam is placed between the main lens group and the auxiliary lens.

41 Claims, 20 Drawing Sheets

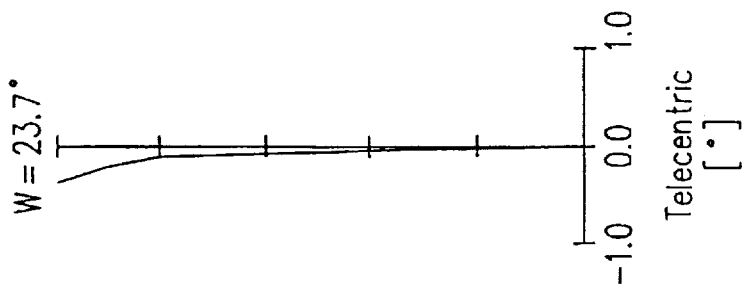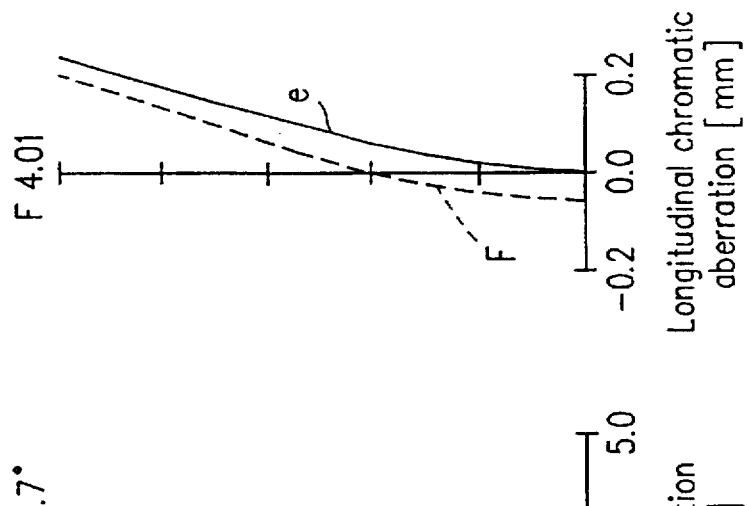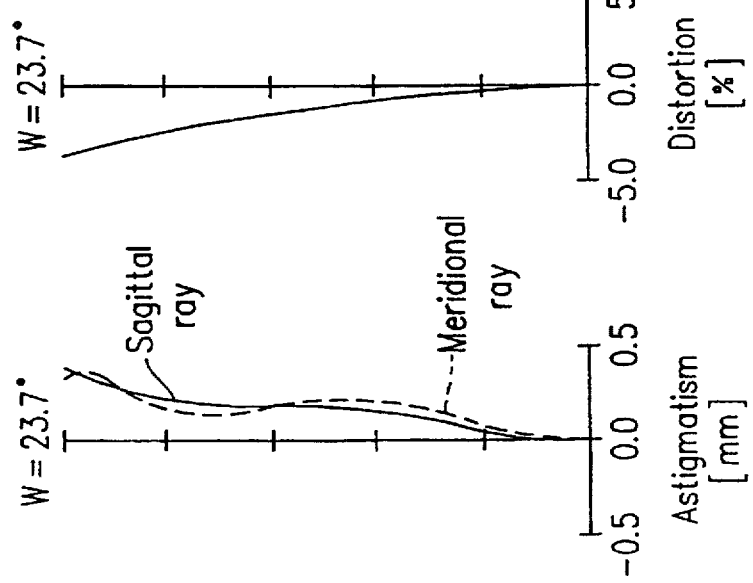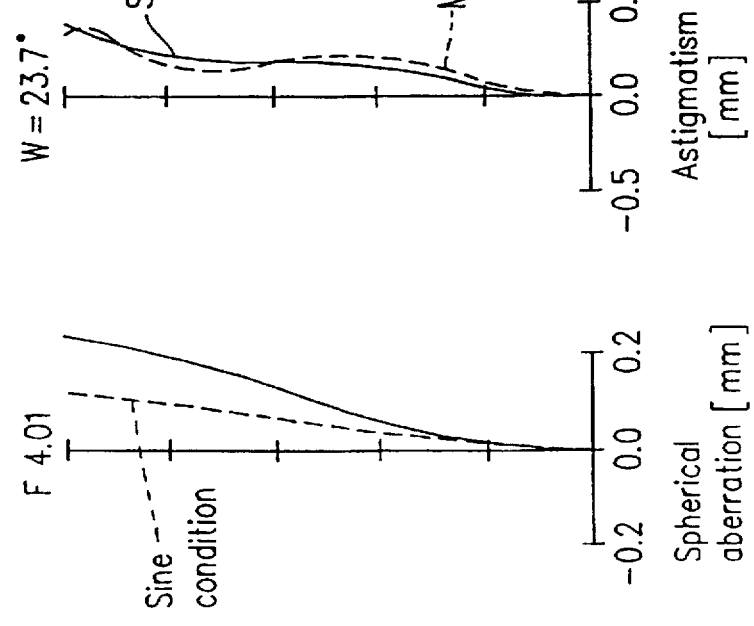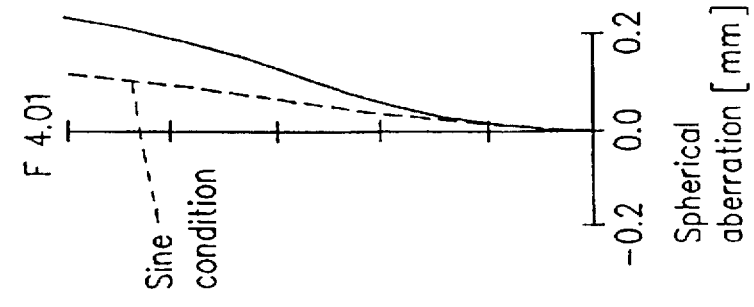

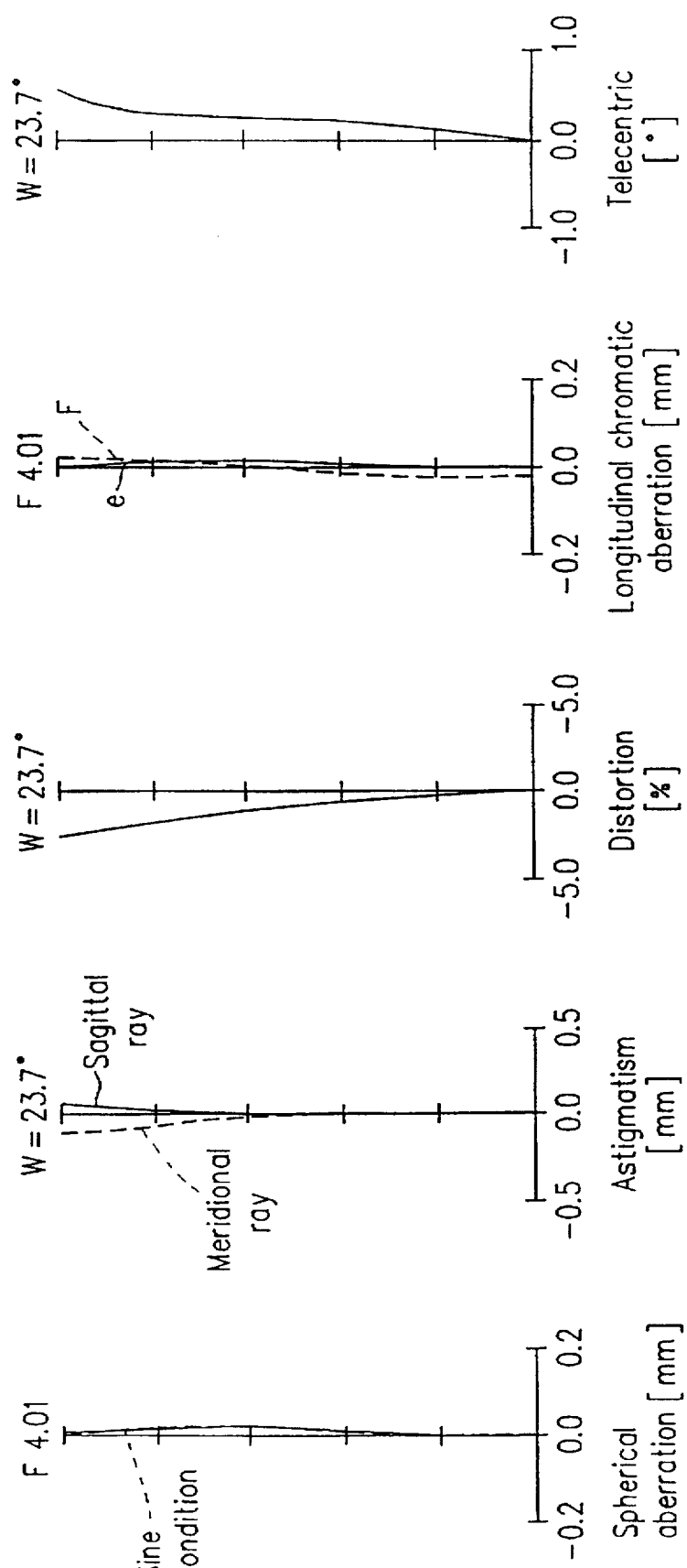

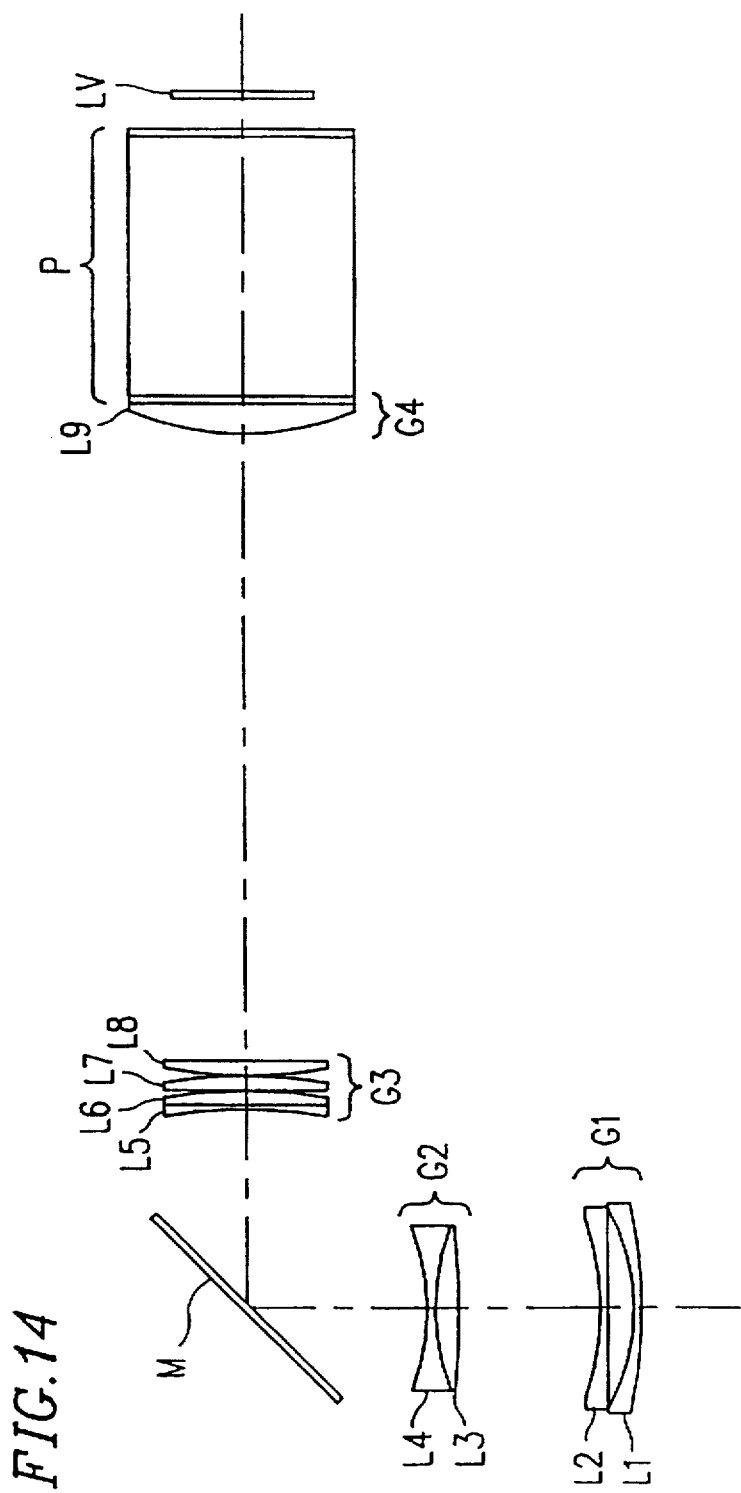

PROJECTION LENS AND PROJECTION DISPLAY APPARATUS

BACKGROUND OF THE INVENTION

1. Field of the Invention

The present invention relates to a projection lens for magnifying and projecting an optical image formed on a light valve onto a screen, and a projection display apparatus using the projection lens.

2. Description of the Related Art

As a conventional method for obtaining a large screen image, one including the steps of forming an optical image in accordance with a video signal on a light valve, and irradiating light to the optical image so as to magnify and project the optical image onto a screen by a projection lens has been well-known. In recent years, projection display apparatus using a liquid crystal panel as a light valve have received much attention.

In an attempt to obtain projected images with higher resolution, U.S. Pat. No. 4,191,456 of Byung S. Hong et al. proposes a method using a reflection light valve capable of increasing the number of pixels without decreasing an opening ratio of a liquid crystal panel. In the case of reflection light valves, switching elements are not required to be placed between pixel electrodes on a substrate, so that a pixel pitch can be decreased and high pixel density can readily be achieved. Thus, the reflection light valves enable to obtain projection images with more brightness and higher resolution, compared with transmission light valves.

A basic structure and an operation principle of a reflection light valve 100 will be described with reference to FIG. 1. The reflection light valve 100 includes two glass substrates 1 and 7, transparent electrodes 2 and 6 respectively formed on the glass substrates 1 and 7, a light conductive layer 3, a light reflective layer 4, and a liquid crystal layer 5 as a light modulation layer, which are interposed between the transparent electrodes 2 and 6. A voltage is applied across these two transparent electrodes 2 and 6.

Writing light 8 from an image source is incident upon the light conductive layer 3 through the glass substrate 1. On the other hand, reading (projection) light 9 is incident upon the liquid crystal layer 5 through the glass substrate 7. A voltage applied to the liquid crystal layer 5 changes in accordance with a writing image formed on the light conductive layer 3, whereby the reading light 9 is modulated. The modulated reading light 9 is reflected by the light reflective layer 4, and then, is projected onto a screen (not shown) as a projected image. As a material for the light modulation layer, ferroelectric liquid crystal, nematic liquid crystal, or the like can be used.

FIG. 2 shows an example of a basic structure of a projection display apparatus 200 using the reflection light valve 100. In the projection display apparatus 200, light 12 which is nearly parallel light and output from a light source 11 is split by a polarizer-beam splitter 13 into an S-polarized light component 14 reflected by the polarizer-beam splitter 13 and a P-polarized light component 15 transmitted through the polarizer beam-splitter 13. The S-polarized light component 14 is incident upon the reflection light valve 100 as reading light. The reflection light valve 100 modulates the reading light utilizing birefringence (double refractivity) of liquid crystal.

Writing light 16 from an image source 17 such as a CRT is formed as a writing image onto the light conductive layer of the reflection light valve 100 by a writing lens 18. The birefringent characteristics of the liquid crystal layer 5 changes due to an applied voltage in accordance with the writing image, and when linear polarized light having a predetermined polarization direction is incident upon the reflection light valve 100 as reading light, reflected light therefrom becomes elliptically polarized light. Thus, the S-polarized light component 14 which is incident as reading light has its part converted into a P-polarized light component and reflected by the reflection light valve 100 and is incident upon the polarizer-beam splitter 13 again. The P-polarized light component contained in the reflected light passes through the polarizer-beam splitter 13 and is incident upon a projection lens 19. The S-polarized light component contained in the reflected light is reflected by the polarizer-beam splitter 13 and travels to the light source 11. In this manner, the optical image formed in the liquid crystal layer 5 of the reflection light valve 100 as the change in the birefringent characteristics is magnified and projected onto a screen (not shown) by the projection lens 19.

In order to obtain a full color projected image with high brightness and high resolution, three reflection light valves respectively for red, green and blue colors can be used. FIGS. 3A through 3C show three examples of conventional basic structures from the reflection light valve to the projection lens.

FIG. 3A shows a structure 210 in the case of using three projection lenses 23a to 23c and three polarizer-beam splitters 22a to 22c, respectively for red, green, and blue colors. In the structure 210, since optical elements other than the polarizer-beam splitters 22a, 22b, and 22c are not disposed in space between reflection light valves 21a, 21b, and 21c and the projection lenses 23a, 23b, and 23c, there is little adverse effect on fundamental optical performance such as contrast and brightness. Furthermore, a back focus of the projection lenses 23a, 23b, and 23c is relatively short, which is advantageous for designing projection lenses. However, problems caused by using three projection lenses, such as color shading on a screen, complexity of convergence adjustment, and high cost, cannot be avoided.

Next, FIG. 3B shows a structure 220 in the case of using one projection lens 27 and one polarizer-beam splitter 26. As shown in FIG. 3B, in the case where substantially one projection lens 27 is used, not only the polarizer-beam splitter 26, but also a color combining optical system (dichroic mirrors 24 and 25) combining output light beams from light valves 21a to 21c into one light beam are placed between the projection lens 27 and the light valves 21a to 21c. White light is incident upon the polarizer-beam splitter 26. This white light is output from the polarizer-beam splitter 26, split into three chromatic components such as red, green, and blue light beams by the two dichroic mirrors 24 and 25, and incident upon the respectively corresponding reflection light valves 21a, 21b, and 21c. In the structure 220, one projection lens 27 and one polarizer-beam splitter 26 are used, so that the problems caused in the above-mentioned structure 210 are eliminated, and a compact projection display apparatus with the reduced number of components can be constructed.

However, the dichroic mirrors 24 and 25 utilize a dielectric multi-layer film and has an effect of changing a phase of incident light. Thus, in the structure 220, a polarization state of light, which travels between the polarizer-beam splitter 26 and the reflection light valves 21a, 21b, and 21c, is slightly modulated from an ideal state by the dichroic mirrors 24 and 25 placed therebetween. Therefore, a problem of degradation of contrast performance of a projected image occurs.

FIG. 3C shows a structure 230 in the case of using one projection lens 28 and three polarizer-beam splitters 22a to 22c. The structure 230 is the same as the structure 220 in that polarizer-beam splitters 22a to 22c and dichroic mirrors 24 and 25 are provided. However, in the structure 230, the dichroic mirrors 24 and 25 are not provided between the reflection light valves 21a to 21c and the polarizer-beam splitters 22a to 22c, so that the problems caused in the structures 210 and 220 can be eliminated simultaneously.

However, an image source (not shown) such as a CRT and an optical system (not shown) for writing the image on the reflection light valves 21a to 21c are provided on each light writing side of the three reflection light valves 21a to 21c. Therefore, in the structure 230, the entire system has dead space, making it difficult to construct a projection display apparatus compact in size.

In order to solve the above-mentioned problem in the structure 230, each optical axis of the light valves 21a to 21c is required to be parallel with each other. For this purpose, means for changing a light traveling direction may provided between the projection lens 28 and the light valves 21a to 21c. In this case, space for providing the means for changing a light traveling direction as well as the polarizer-beam splitters 22a to 22c and the dichroic mirrors 24 and 25 is required between the projection lens 28 and the light valves 21a to 21c. Thus, the back focus of the projection lens 28 is required to be very long.

As a lens structure in which the back focus $f_B$ is longer than the focal length f (in other words, the back focus ratio $f_B/f$ which is a ratio of the back focus $f_B$ to the focal length f is large), a wide-angle lens of retro-focus type is known (for example, U.S. Pat. No. 5,218,480 to Jacob Moskovich). In the lens structure of retro-focus type, a front group of negative power lenses and a back group of positive power lenses are placed sequentially from a screen side. However, in the lens structure of retro-focus type, a lens realizing a back focus ratio: $f_B/f \geq 4.0$, for example, (a wide-angle lens having a semi-field angle of 40° or more) has a small focal length f. Therefore, it is difficult to obtain a back focus $f_B$ sufficient for ensuring physical space required for placing two dichroic mirrors, polarizer-beam splitters, and plane mirrors for changing a light traveling direction. For example, the semi-field angle of a lens satisfying the condition of 100 inches of screen projection size and 3 m of projection length is in the range of 20° to 25°. Examples of the lenses which have an angle of view in this range and satisfy the back focus ratio: $f_B/f \geq 4.0$ cannot be found in photograph lenses and lenses in the other fields.

Regarding the above-mentioned problem, when the entire space for placing the dichroic mirrors 24 and 25 and the like is filled with glass or liquid to form a prism, a reduced optical path length scaled in the air becomes short, which is somewhat advantageous for designing the projection lens. However, the volume of the prism becomes very large, so that cost remarkably increases in the case of a glass prism. In the case of a liquid prism, although a problem related to cost is eliminated, a refractive index greatly depends upon temperature. Therefore, image forming performance is more badly affected as liquid occupies a larger portion of the optical path.

Furthermore, in general, polarizer-beam splitters which are placed in a back focus length utilize a dielectric multi-layer film. In this type of polarizer-beam splitter, optical performance changes depending upon an incident angle of incident light, and this incident angle dependence degrades contrast of a projected image. Thus, in order to make contrast in the entire screen satisfactory, it is required that principal rays passing through the polarizer-beam splitter are parallel with the optical axis, that is, they are telecentric.

SUMMARY OF THE INVENTION

The projection lens of this invention, includes sequentially from a screen side: a first lens group which has a negative power; a second lens group which has a weaker power than that of the first lens group; a third lens group which has a positive power; a fourth lens group which has a positive power; and at least one transparent prism, wherein the fourth lens group is placed on the third lens group side of the transparent prism so as to be close to or in contact with the transparent prism.

In one embodiment of the invention, the above-mentioned projection lens satisfies the following conditions:

$$-1.7 \leq \frac{f_{G1}}{f} \leq -1.0 \quad (1)$$

$$-1.6 \leq \frac{f_{G1} f_{G2}}{f(f_{G1} + f_{G2})} \leq -1.1 \quad (2)$$

$$1.6 \leq \frac{d_{G2}}{f} \leq 2.1 \quad (3)$$

$$1.0 \leq \frac{d_{G3}}{f_{G4}} \leq 1.2 \quad (4)$$

where f is a combined focal length of an entire system, $f_{G1}$ is a focal length of the first lens group, $f_{G2}$ is a focal length of the second lens group, $f_{G4}$ is a focal length of the fourth lens group, $d_{G2}$ is an air interval between the second lens group and the third lens group, and $d_{G3}$ is an air interval between the third lens group and the fourth lens group.

In another embodiment of the invention, the first lens group includes sequentially from the screen side a negative meniscus lens having a convex face on the screen side and a negative lens having a concave face on an opposite side of the screen.

In another embodiment of the invention, the second lens group has a positive lens and a negative lens, and an Abbe number of the negative lens is smaller than an Abbe number of the positive lens.

In another embodiment of the invention, the second lens group is a cemented lens of a positive lens and a negative lens, and an Abbe number of the negative lens is smaller than an Abbe number of the positive lens.

In another embodiment of the invention, the third lens group includes a cemented lens.

In another embodiment of the invention, the third lens group includes sequentially from the screen side four lenses of a negative lens, a positive lens, a positive lens, and a positive lens.

In another embodiment of the invention, the fourth lens group is a planoconvex lens having a convex face on the screen side.

In another embodiment of the invention, the convex face of the planoconvex lens is aspherical.

In another embodiment of the invention, the fourth lens group is a planoconvex lens having a convex face on the screen side and a flat face cemented to the transparent prism.

In another embodiment of the invention, focus is adjusted by moving the first lens-group and the second lens group in an optical axis direction, positions of the third lens group and the fourth lens group being fixed.

In another embodiment of the invention, a principal ray in the transparent prism is substantially parallel with an optical axis of the fourth lens group.

In another embodiment of the invention, the above-mentioned projection lens satisfies the following condition:

$$4.0 \leq \frac{(d_{G3} + d_P)}{f} \leq 5.0 \quad (5)$$

where f is a combined focal length of an entire system, $d_{G3}$ is an air interval between the third lens group and the fourth lens group, and $d_P$ is a reduced optical path length scaled in the air of the transparent prism in an optical axis direction.

In another embodiment of the invention, the transparent prism is a polarizer-beam splitter provided with a polarization splitting face.

In another embodiment of the invention, one plane mirror is placed in space between the second lens group and the third lens group.

Alternatively, a projection lens of the present invention includes: a main lens group including sequentially from a screen side a first lens group which has a negative power, a second lens group which has a weaker power than that of the first lens group, and a third lens group which has a positive power; three auxiliary lenses which have identical optical characteristics and a positive power; and three polarizer-beam splitters which are transparent prisms, the three auxiliary lenses being respectively positioned close to or cemented to faces of the corresponding polarizer-beam splitters on a side of the third lens group; two dichroic mirrors; and at least one plane mirror, wherein light beams output from the three polarizer-beam splitters are incident upon the corresponding three auxiliary lenses; light beams output from the three auxiliary lenses are combined to one light beam by the at least one mirror and the two dichroic mirrors, the combined light beam being incident upon the main lens group; and wherein three systems from the main lens group to the three auxiliary lenses respectively have predetermined image forming characteristics.

In one embodiment of the invention, the above-mentioned projection lens satisfies the following conditions:

$$-1.7 \leq \frac{f_{G1}}{f} \leq -1.0 \quad (1)$$

$$-1.6 \leq \frac{f_{G1}f_{G2}}{f(f_{G1}+f_{G2})} \leq -1.1 \quad (2)$$

$$1.6 \leq \frac{d_{G2}}{f} \leq 2.1 \quad (3)$$

$$1.0 \leq \frac{d_{G3}}{f_{G4}} \leq 1.2 \quad (4)$$

where f is a combined focal length of an entire system, $f_{G1}$ is a focal length of the first lens group, $f_{G2}$ is a focal length of the second lens group, $f_{G4}$ is a focal length of the auxiliary lenses, $d_{G2}$ is an air interval between the second lens group and the third lens group, and $d_{G3}$ is an air interval between the third lens group and the auxiliary lenses.

In one embodiment of the invention, the main lens group, the three auxiliary lenses, the three polarizer-beam splitters, the two dichroic mirrors, and the at least one plane mirror are accommodated in one container.

In another embodiment of the invention, each reflective face of the two dichroic mirrors is parallel with each reflective face of the at least one plane mirror.

In another embodiment of the invention, each optical axis of the three auxiliary lenses is in an identical plane.

In another embodiment of the invention, each optical axis of the three auxiliary lenses is parallel with each other.

In another embodiment of the invention, each polarization splitting face of the three polarizer-beam splitters is parallel with each other.

In another embodiment of the invention, light beams incident upon the three polarizer-beam splitters are S-polarized light beams.

In another embodiment of the invention, the polarizer-beam splitter includes: a frame; a plurality of transparent substrates to be an incident window and an output window; transparent liquid provided in a container which is formed including the frame and the plurality of transparent substrates; and a polarization splitting face positioned in the transparent liquid, wherein the polarization splitting face has a dielectric multi-layer film formed on a transparent plate.

In another embodiment of the invention, a main component of the transparent liquid is ethylene glycol.

According to another aspect of the invention, a projection display apparatus includes: a light source for radiating reading light containing three primary color components; color separation means for separating the reading light radiated from the light source into three primary color beams; three reflection light valves; and a projection lens having: a main lens group including sequentially from a screen side a first lens group which has a negative power, a second lens group which has a weaker power than that of the first lens group, and a third lens group which has a positive power; three auxiliary lenses which have identical characteristics and a positive power; three polarizer-beam splitters which are transparent prisms, the three auxiliary lenses being respectively positioned close to or cemented to faces of the polarizer-beam splitters on a side of the third lens group; two dichroic mirrors; and at least one plane mirror; and three light writing means for forming an optical image on each of the reflection light valves, wherein the three primary color light beams output from the color separation means are incident upon the corresponding reflection light valves through the three polarizer-beam splitters of the projection lens, light beams reflected by each of the reflection light valves are incident upon the corresponding auxiliary lenses through the corresponding polarizer-beam splitters, and light beams output from the three auxiliary lenses are combined into one light beam by the at least one plane mirror and the two dichroic mirrors and incident upon the main lens group, whereby optical images formed on the reflection light valves are projected on the screen by the light write means.

In one embodiment of the invention, the above-mentioned projection display apparatus satisfies the following conditions:

$$-1.7 \leq \frac{f_{G1}}{f} \leq -1.0 \quad (1)$$

$$-1.6 \leq \frac{f_{G1}f_{G2}}{f(f_{G1}+f_{G2})} \leq -1.1 \quad (2)$$

$$1.6 \leq \frac{d_{G2}}{f} \leq 2.1 \quad (3)$$

$$1.0 \leq \frac{d_{G3}}{f_{G4}} \leq 1.2 \quad (4)$$

where f is a combined focal length of an entire system, $f_{G1}$ is a focal length of the first lens group, $f_{G2}$ is a focal length of the second lens group, $f_{G4}$ is a focal length of the auxiliary lenses, $d_{G2}$ is an air interval between the second lens group and the third lens group, and $d_{G3}$ is an air interval between the third lens group and the auxiliary lenses.

In one embodiment of the invention, the above-mentioned projection display apparatus includes at least one pre-polarizer placed in an optical path from the light source to the polarizer-beam splitter in such a manner that illuminance of light output from the pre-polarizer becomes substantially maximum on the reflection light valves.

In another embodiment of the invention, the above-mentioned projection display apparatus includes three pre-polarizers placed in an optical path from the color separation means to the polarizer-beam splitter in such a manner that illuminance of light output from each of the pre-polarizers becomes substantially maximum on the corresponding reflection light valves.

In another embodiment of the invention, the pre-polarizer is a transparent prism including: a frame, two transparent substrates to be an incident window and an output window; transparent liquid provided in a container which is formed including the frame and the two transparent substrates; at least one polarization splitting face placed in the transparent liquid and having a dielectric multi-layer film formed on a transparent plate; and at least one plane mirror placed in the transparent liquid.

In another embodiment of the invention, a main component of the transparent liquid is ethylene glycol.

In another embodiment of the invention, the pre-polarizer includes two polarization splitting faces and two plane mirrors, and the polarization splitting faces and the plane mirrors are placed so as to be symmetrical with each other with respect to an optical axis of light output from the light source.

In another embodiment of the invention, in the pre-polarizer, the polarization splitting faces reflect a predetermined polarized light component among light incident thereupon, the plane mirrors reflect the reflected polarized light component, and the polarization splitting faces further reflect the polarized light component reflected by the plane mirrors, whereby the reflected polarized light component travels toward a direction from which the incident light is incident.

In another embodiment of the invention, the polarizer-beam splitter includes: a frame; a plurality of transparent substrates to be an incident window and an output window; transparent liquid provided in a container which is formed including the frame and the plurality of transparent substrates; and a polarization splitting face positioned in the transparent liquid, wherein the polarization splitting face has a dielectric multi-layer film formed on a transparent plate.

In another embodiment of the invention, a main component of the transparent liquid is ethylene glycol.

In another embodiment of the invention, the pre-polarizer and the polarizer-beam splitter are placed so that linear polarized light output from the pre-polarizer is incident upon the polarizer-beam splitter as S-polarized light.

In another embodiment of the invention, the reflection light valve includes a transparent electrode, a light conductive layer, a light reflective layer, and a light modulation layer, and the light modulation layer has polarization characteristics which change in accordance with an illuminance distribution of an image written in the light conductive layer.

In another embodiment of the invention, a material of the light modulation layer is liquid crystal, and the light modulation layer forms an optical image by modulating a polarization state of incident light.

In another embodiment of the invention, the light writing means includes image forming means, and image transfer means for imaging an optical image formed on the image forming means onto the reflection light valves.

In another embodiment of the invention, each optical axis of the three auxiliary lenses, the three reflection light valves, and the three light write means is in an identical plane and is parallel with each other, and each polarization splitting face of the three polarizer-beam splitters is parallel with each other.

Thus, the invention described herein makes possible the advantages of (1) providing a projection lens having a sufficiently long back focus and a very large substantial back focus ratio (i.e., 4.0 or more), being telecentric on a light valve side, having small distortion and sufficient resolution; and (2) providing a projection display apparatus compact in size, which realizes sufficient space capable of accommodating a color combining optical system and a polarizer-beam splitter and displays a large screen projected image with high image quality by using the projection lens.

These and other advantages of the present invention will become apparent to those skilled in the art upon reading and understanding the following detailed description with reference to the accompanying figures.

BRIEF DESCRIPTION OF THE DRAWINGS

FIGS. 11A through 11E are diagrams showing aberrations of the projection lens of the second example according to the present invention.

FIGS. 13A through 13E are diagrams showing aberrations of the projection lens of the fourth example according to the present invention.

FIG. 14 is a cross-sectional structural view of another projection lens of the fourth example according to the present invention.

DESCRIPTION OF THE PREFERRED EMBODIMENTS

Figure 3A:
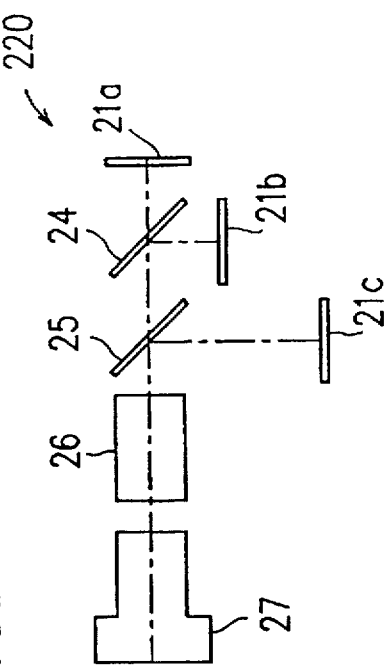
FIGS. 3A through 3C are schematic structural views illustrating exemplary structures of a projection optical system.
Figure 3B:
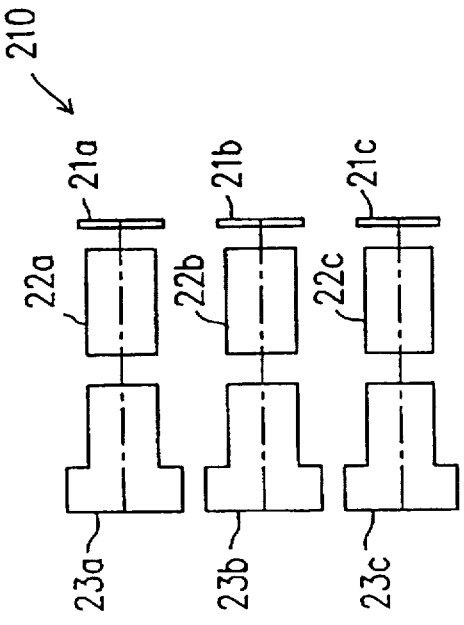
Figure 3C:
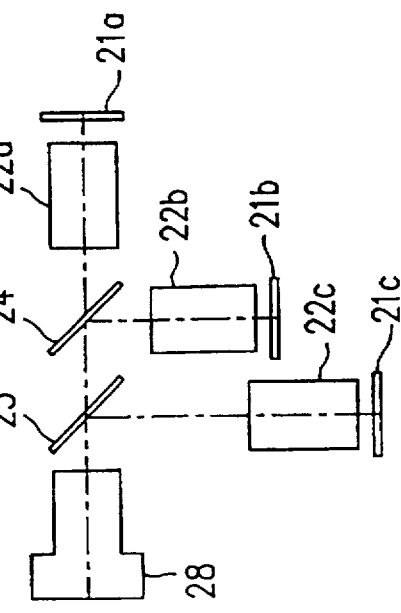
Figure 4:
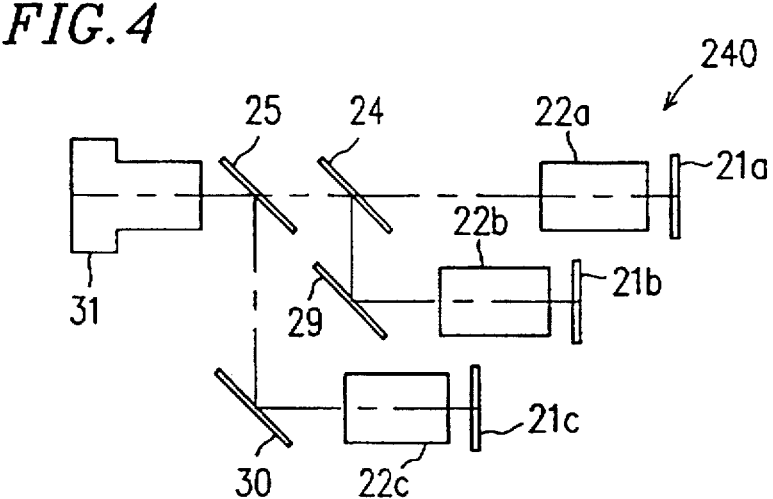
FIG. 4 is a view showing an exemplary structure of a projection optical system using a projection lens of the present invention.

FIG. 4 shows a structure 240 of a projection optical system, using a projection lens of the present invention, from reflection light valves to the projection lens. In the structure 240, optical axes of reflection light valves 21a to 21c are made parallel with each other by adding two plane mirrors 29 and 30 to the structure 230 shown in FIG. 3C. According to the structure 240, all of the problems caused in the above-mentioned conventional three structures 210 to 230 can be overcome. In order to realize the structure 240, sufficient space for accommodating polarizer-beam splitters 22a to 22c and a color combining optical system for combining light output from the reflection light valves 21a to 21c into one light beam is required between a projection lens 31 and the reflection light valves 21a to 21c. The projection lens 31 has a very long back focus for obtaining such space.

For example, assuming that an effective display region of the reflection light valves is 2.5 inches (aspect ratio: 4:3), a required back focus becomes at least 300 mm (as a reduced optical path length scaled in the air). Furthermore, assuming that a screen projection size is 100 inches and a projection length is 3 m, it is desired that the condition of the back focus satisfies the above-mentioned physical optical path length and the ratio of the back focus $f_B$ with respect to a focal length f of the projection lens (hereinafter, referred to as a back focus ratio) is 4.0 or more. However, there are no conventional projection lenses which satisfy the conditions of such physical optical path length and back focus ratio, and therefore, the preferred structure 240 as shown in FIG. 4 was not able to be realized.

The present invention will be described by way of illustrative examples with reference to the drawings.

Figure 5:
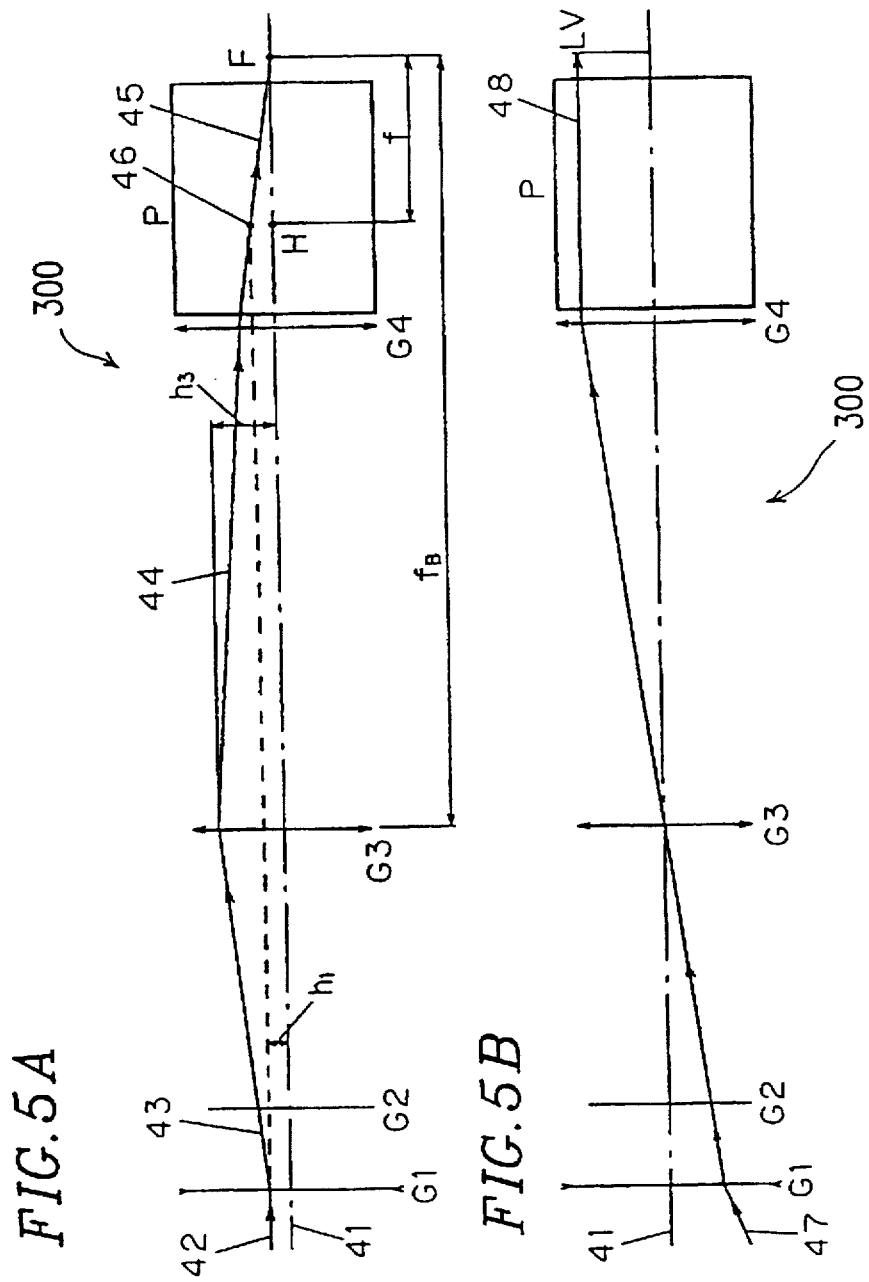
FIGS. 5A and 5B are views illustrating a principle of a projection lens of the present invention.

First, assuming that each lens group of a projection lens 300 of the present invention is composed of thin lenses, a function of the projection lens 300 will be described with reference to FIGS. 5A and 5B. As shown in FIGS. 5A and 5B, the projection lens 300 includes a first lens group G1 which has a negative power, a second lens group G2 which has a weak power, a third lens group G3 which has a positive power positioned away from the second lens group G2, a fourth lens group G4 positioned away from the third lens group G3, and a prism P.

As shown in FIG. 5A, the case where a light beam 42, which is an on-axis light beam, is incident upon a system from the first lens group G1 to the fourth lens group G4 of the projection lens 300 from a screen (not shown) side, will be considered. The light beam 42 is parallel with an optical axis 41 and has a light beam height $h_1$.

The light beam 42 is converted into a diverging light beam 43 by the first lens group G1. After the diverging light beam 43 passes through the second lens group G2, the height of the light beam increases to be a height $h_3$ in the third lens group G3. Since the power of the third lens group G3 is positive, the diverging light beam 43 becomes a converging light beam 44 after being output from the third lens group G3. The converging light beam 44 is further converged to become a converging light beam 45 while passing through the fourth lens group G4 and is output therefrom.

A point where the converging light beam 45 crosses the optical axis 41 is a focal point F, and a bottom of a vertical line drawn from a crossing point 46 of the light beam 42 and the converging light beam 45 to the optical axis 41 is a main point H. The length from the main point H to the focal point F is a focal length f. In this specification, a system from the first lens group G1 to the third lens group G3 is defined as a main lens group, and a length from the third lens group G3 to the focal point F (excluding the thickness of the fourth lens group G4 in the optical axis direction) is defined as a back focus $f_B$ of the main lens group.

The prism P substantially changes a value of the back focus $f_B$ of the projection lens 300 due to its refractive index, so that the optical path length in the prism P is represented by a reduced optical path length scaled in the air $d_P = l_P / n_P$, where $l_P$ is a physical length of the prism P in the optical axis-direction and $n_P$ is a refractive index of the prism P.

In the projection lens 300, a combined focal length of the first lens group G1 and the second lens group G2 has a negative power and an interval between the second lens group G2 and the third lens group G3 is large, so that the light beam height ratio $h_3/h_1$ becomes large and the back focus ratio $f_B/f$ of the main lens group can be increased.

Furthermore, since the fourth lens group G4 is placed between the third lens group G3 and the focal point F so as to be away from both sides, even in the case where the back focus $f_B$ of the main lens group is very long, a desired effective aperture ratio can be obtained without substantially increasing an effective aperture of the third lens group G3.

Next, as shown in FIG. 5B, the case where an off-axis principal ray 47 is incident from a screen side will be described. Since the fourth lens group G4 is close to the prism P, a principal ray 48 in the effective region of the prism P can be made almost parallel with the optical axis 41 by appropriately selecting a configuration of a lens surface of the fourth lens group G4. In the fourth lens group G4, the light beam height of the on-axis converging light beam 45 is small (FIG. 5A) and the light beam height of the off-axis principal ray 48 is large. Thus, the fourth lens group G4 can change the off-axis aberration of the entire system of the projection lens 300 without substantially changing the spherical aberration of the entire system of the projection lens 300. In particular, telecentricity can be enhanced by introducing an aspherical lens into the fourth lens group G4 and allowing the aspherical face of the aspherical lens to generate positive distortion. Simultaneously, negative distortion generated in the system from the first lens group G1 to the third lens group G3 is corrected by the fourth lens group G4, whereby the distortion of the entire system can be reduced.

The second lens group G2 of a weak power has a function of correcting distortion, chromatic aberration of magnification, and the like, generated in the first lens group G1 while retaining the combined focal length with respect to the first lens group G1 as a negative power, and corrects various aberrations of the entire system in a well-balanced manner.

Next, the condition under which the projection lens 300 of the present invention realizes desired characteristics will be described. Some formulae are used a plurality of times in the above description. The formulae representing the identical condition are provided with their respective reference numbers in brackets.

The above-mentioned Formula (1) shows the condition under which a focal length $f_{G1}$ of the first lens group G1 is defined in a predetermined range, whereby a back focus of the main lens group becomes a desired value while an aberration balance of the entire system is retained. In the case where a ratio $f_{G1}/f$ of the focal length $f_{G1}$ of the first lens group with respect to the combined focal length f of the entire system is smaller than the lower limit value, in order to obtain a desired back focus, the second lens group G2 is overloaded, so that it becomes difficult to allow the third lens group G3 and the fourth lens group G4 to correct various aberrations generated in the second lens group G2. On the other hand, in the case where the ratio $f_{G1}/f$ is larger than the upper limit value, although a desired back focus is obtained, it becomes difficult to allow the second lens group G2, the third lens group G3, and the fourth lens group G4 to correct off-axis aberration generated in the first lens group G1.

The above-mentioned Formula (2) shows the condition under which a power distribution between the focal length $f_{G1}$ of the first lens group G1 and a focal length $f_{G2}$ of the second lens group G2 is defined in a predetermined range while the condition of Formula (1) is satisfied. The second lens group G2 has a function of correcting distortion, chromatic aberration of magnification, and the like generated in the first lens group G1, and various aberrations generated in the prism P. By satisfying the condition of Formula (2), the back focus of the main lens group can become a desired value while the aberration balance of the entire system is retained. In the case where the value of $f_{G1} \cdot f_{G2}/[f(f_{G1}+f_{G2})]$ is smaller than the lower limit value, it becomes difficult to obtain a desired back focus while the aberration balance of the entire system is retained. In the case where this value is larger than the upper limit value, it becomes difficult to allow the third lens group G3 and the fourth lens group G4 to correct various aberrations generated in the first lens group G1 and the second lens group G2.

The above-mentioned Formula (3) shows the condition under which a back focus of the main lens group becomes a desired value and a peripheral light amount is simultaneously prevented from decreasing. In the case where a ratio $d_{G2}/f$ of an air interval do between the second lens group G2 and the third lens group G3 with respect to the combined focal length of the entire system is smaller than the lower limit value, it becomes difficult to obtain a required back focus. When it is attempted to force the back focus to be longer, the third lens group G3 is overloaded, and it becomes difficult to correct various aberrations of the entire system in a well-balanced manner. On the other hand, in the case where the ratio $d_{G2}/f$ is larger than the upper limit value, although it is advantageous for lengthening a back focus, this results in the decrease in peripheral light amount.

The effective aperture of the first lens group G1 can be increased in order to increase the peripheral light amount. However, this results in great increase in cost. The effective aperture of the third lens group G3 can be increased so as to increase the peripheral light amount. However, the effective aperture of the color combining optical system (placed between the third lens group G3 and the fourth lens group G4) also becomes large, so that it becomes difficult to place the color combining optical system between the third lens group G3 and the fourth lens group G4. Thus, the back focus of the main lens group should be further lengthened. This makes it difficult to correct various aberrations of the entire lens system in a well-balanced manner.

Formula (4) shows the condition under which the principal ray passing through the prism (a polarizer-beam splitter) P becomes almost parallel with the optical axis, that is, the principal ray becomes telecentrically satisfactory. In general, the polarizer-beam splitter using a dielectric multi-layer film has its optical characteristics changed by the incident angle of an incident light beam. For this reason, in the case where the principal ray in the effective region does not pass through the dielectric multi-layer film at the same incident angle, unevenness of image quality is caused in a projected image. In order to avoid this, telecentricity should be satisfactory. In the case where $f_{G4}/d_{G3}$ is smaller than the lower limit value or larger than the upper limit value, telecentricity becomes insufficient in both the cases. Therefore, unevenness of image quality is caused in a projected image.

Next, the projection lens of the present invention will be described by way of specific examples.

Figure 6:
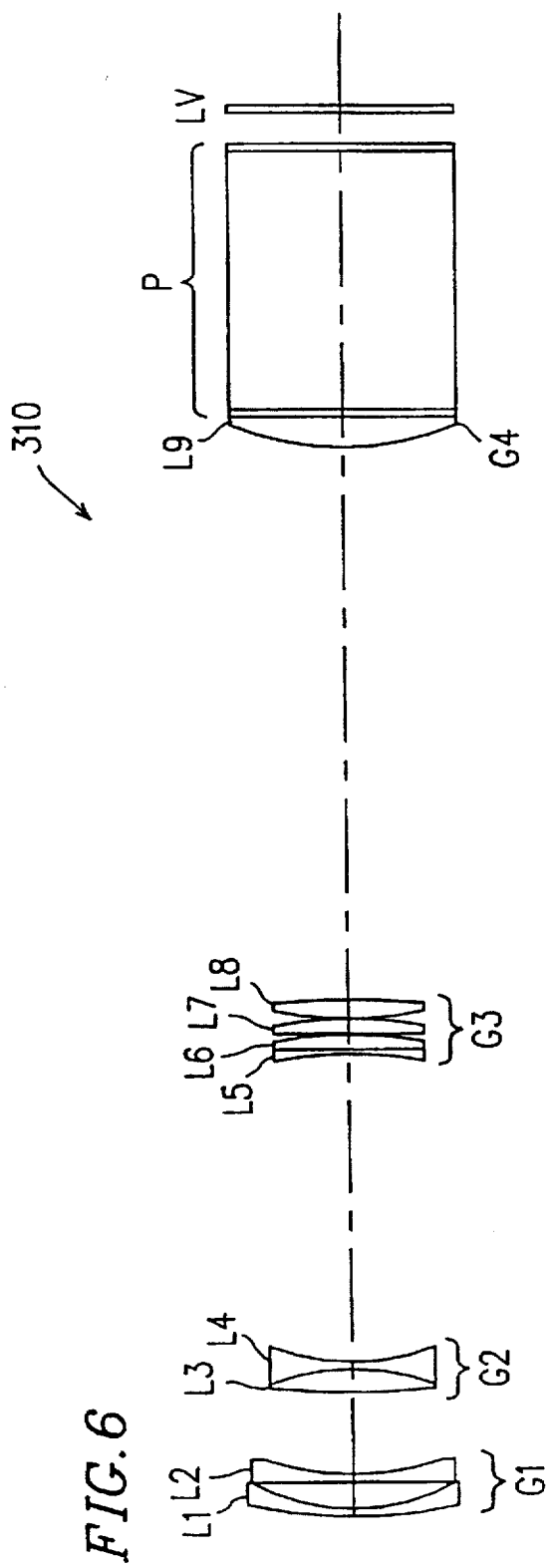
FIG. 6 is a cross-sectional structural view of a projection lens of the first example according to the present invention.

FIG. 6 shows a structure of a projection lens 310 of the first example according to the present invention. Specific numerical values showing lens data of each lens of the projection lens 310 are shown in Table 1. As shown in FIG. 6, the projection lens 310 includes a first lens group G1, a second lens group G2, a third lens group G3, a fourth lens group G4, and a polarizer-beam splitter P. In FIG. 6, LV represents a glass substrate on a reading side of a reflection light valve. An i-th lens in the entire lens system of the projection lens 310 is represented by $L_i$.

In Table 1, $r_j$ is a radius of curvature of a j-th face; $d_j$ is an interval from the j-th face to the subsequent (j+1)th face; $n_j$ and $v_j$ are a refractive index and an Abbe number, respectively, in e-rays from the j-th face to the (j+1)th face; $\omega$ is a semi-field angle on a screen side; and m is enlargement magnification. A lens surface with "*" is an aspherical face, and its cross-sectional configuration is given by the following Formula (6):

$$S = \frac{h^2/r_j}{1+(1-(1+\kappa_j)(h/r_j)^2)^{1/2}} + \alpha_j h^4 + \beta_j h^6 + \gamma_j h^8 + \delta_j h^{10} \quad (6)$$

where S is a sag amount; h is a height from the optical axis; $K_j$ is a conical constant; and $\alpha_j$, $\beta_j$, $\gamma_j$, and $\delta_j$ are 4-order, 6-order, 8-order, and 10-order aspherical coefficients, respectively.

TABLE 1

| f = 78.249 | F = 4.0 | $\omega$ = 23.3° | m = −40.02 | |
|---|---|---|---|---|
| G1 | $r_1$ = 228.850 | $d_1$ = 3.00 | $n_1$ = 1.51825 | $v_1$ = 64.1 |
| | $r_2$ = 83.272 | $d_2$ = 10.00 | | |
| | $r_3$ = ∞ | $d_3$ = 3.00 | $n_3$ = 1.59143 | $v_3$ = 61.0 |
| | $r_4$ = 115.783 | $d_4$ = 37.95 | | |
| G2 | $r_5$ = 218.215 | $d_5$ = 12.00 | $n_5$ = 1.79191 | $v_5$ = 25.7 |
| | $r_6$ = −109.514 | $d_6$ = 2.50 | $n_6$ = 1.59143 | $v_6$ = 61.0 |
| | $r_7$ = 102.749 | $d_7$ = 129.06 | | |
| G3 | $r_8$ = −147.581 | $d_8$ = 2.00 | $n_8$ = 1.79191 | $v_8$ = 25.7 |
| | $r_9$ = 692.813 | $d_9$ = 8.50 | $n_9$ = 1.51825 | $v_9$ = 64.1 |
| | $r_{10}$ = 133.830 | $d_{10}$ = 0.34 | | |
| | $r_{11}$ = −951.828 | $d_{11}$ = 6.70 | $n_{11}$ = 1.51825 | $v_{11}$ = 64.1 |
| | $r_{12}$ = −161.222 | $d_{12}$ = 0.20 | | |
| | $r_{13}$ = 206.687 | $d_{13}$ = 7.40 | $n_{13}$ = 1.51825 | $v_{13}$ = 64.1 |
| | $r_{14}$ = −249.130 | $d_{14}$ = 237.00 | | |
| G4 | $r_{15}$ = 108.262* | $d_{15}$ = 12.00 | $n_{15}$ = 1.49383 | $v_{15}$ = 57.2 |
| | $r_{16}$ = ∞ | $d_{16}$ = 0.20 | $n_{16}$ = 1.40000 | $v_{16}$ = 51.9 |
| P | $r_{17}$ = ∞ | $d_{17}$ = 2.00 | $n_{17}$ = 1.51825 | $v_{17}$ = 64.1 |
| | $r_{18}$ = ∞ | $d_{18}$ = 109.00 | $n_{18}$ = 1.44150 | $v_{18}$ = 63.1 |
| | $r_{19}$ = ∞ | $d_{19}$ = 2.00 | $n_{19}$ = 1.51825 | $v_{19}$ = 64.1 |
| | $r_{20}$ = ∞ | $d_{20}$ = 12.00 | | |
| L V | $r_{21}$ = ∞ | $d_{21}$ = 2.20 | $n_{21}$ = 1.51825 | $v_{21}$ = 64.1 |
| | $r_{22}$ = ∞ | | | |

Aspherical constants
$\kappa_{15}$=−1.28992×10 $\alpha_{15}$=1.04258×10$^{-6}$ $\beta_{15}$=−4.27780×10$^{-10}$
$\gamma_{15}$=1.23588×10$^{-13}$ $\delta_{15}$=−1.75548×10$^{-17}$
$f_{G1}/f$=−1.381 $f_{G2}/f$=−84.101 $f_{G3}/f$=2.189
$f_{G4}/f$=2.802 $f_{G1}f_{G2}/[f(f_{G1}+f_{G2})]$=−1.359
$d_{G1}/f$=0.485 $d_{G2}/f$=1.649 $d_{G3}/f_{G4}$=1.081 $(d_{G3}+d_{GP})/f$=4.029

As described in FIG. 6, sequentially from the screen side, a first lens L1 is a negative meniscus lens having a convex face on the screen side, a second lens L2 is a planoconcave lens having a flat face on the screen side, a third lens L3 is a double convex lens, a fourth lens L4 is a double concave lens, a fifth lens L5 is a double concave lens, a sixth lens L6 is a double convex lens, a seventh lens L7 is a positive meniscus lens having a concave face on the screen side, an eighth lens L8 is a double convex lens, and a ninth lens L9 is a planoconvex lens having a convex face on the screen side. The third lens L3 is cemented to the fourth lens L4, and the fifth lens L5 is cemented to the sixth lens L6. The convex face of the ninth lens L9 is an aspherical face, and the flat face of the ninth lens L9 is cemented to a prism-shaped polarizer-beam splitter P.

The polarizer-beam splitter P (a detailed structure of which will be described later) is a prism including a transparent glass substrate (thickness: 2 mm) adjacent to the fourth lens group G4, a transparent glass substrate (thickness: 2 mm) on the reflection light valve side, and transparent liquid filled between the substrates. The glass substrate LV on the reading side of the reflection light valve is a transparent glass substrate with a thickness of 2.2 mm, and its face on the screen side is provided with a reflection preventing film. The full length of the polarizer-beam splitter P in the optical axis direction is sufficiently longer than the thickness of the glass substrate LV on the reading side of the reflection light valve.

The first lens L1 and the second lens L2 form the first lens group G1; the third lens L3 and the fourth lens L4 form the second lens group G2; the fifth lens L5, the sixth lens L6, the seventh lens L7, and the eighth lens L8 form the third lens group G3; and the ninth lens L9 forms the fourth lens group. A relatively large air interval is provided between the respective lens groups. Furthermore, diaphragms (not shown) for regulating an F-value, an off-axis upper light beam, and an off-axis lower light beam are provided between the second lens group G2 and the third lens group G3 and between the third lens group G3 and the fourth lens group G4, respectively. It is defined that the lens system from the first lens group G1 to the third lens group G3 is a main lens group, and the fourth lens group is an auxiliary lens.

In order to obtain a long back focus, the structure of the projection lens 310 of the present invention utilizes a structure of a retro-focus type which is generally used for wide-angle lenses (i.e., lenses generally having a semi-field angle of about 30° or more). However, as is understood from the semi-field angle ω on the screen side shown in Table 1, the projection lens 310 of the present invention has an angle of view smaller than those of wide-angle lenses, and hence, the projection lens 310 does not belong to the category of wide-angle lenses. The semi-field angle ω of the projection lens 310 of the present invention is 25° or less, preferably in the range of 23° to 24°, and more preferably in the range of 23.3° to 23.8°.

It is known that correction of distortion and chromatic aberration in magnification are not easy in the lens structure of retro-focus type. In the structure of the projection lens 310 of the present invention, in order to obtain a long back focus, the first lens group G1 includes two negative lenses and has a strong negative power. The distortion and the chromatic aberration generated in the first lens group G1 are corrected by the second lens group which includes a positive lens and a negative lens and has a weak power. The second lens group G2 includes a positive lens and a negative lens having an Abbe number larger than that of the positive lens.

Cemented lenses are used in the second lens group G2 and the third lens group G3, respectively, and a balance between these two cemented faces are adjusted so that on-axis chromatic aberration and magnification chromatic aberration are corrected in a well-balanced manner. In order for the second lens group G2 to correct most of the chromatic aberration generated in the first lens group G1, the second lens group G2 includes two lenses, i.e., a positive lens and a negative lens, and the Abbe number of the positive lens is prescribed to be smaller than that of the negative lens. An air interval between the first lens group G1 and the second lens group G2 can be prescribed to be longer than a central thickness of the negative lenses L1 and L2 forming the first lens group G1. By doing so, the off-axis aberration generated in the first lens group G1 can be corrected by the second lens group G2 in a well-balanced manner.

The third lens group G3 includes a negative lens, a positive lens, a positive lens, and a positive lens sequentially from the screen side, and has a positive power as a whole. The third lens group G3 has a function of converting light which is diverged by the first lens group G1 into converging light, and correcting various aberrations generated in the first lens group G1 and the second lens group G2, thereby making the aberration balance in the entire system satisfactory. Furthermore, in order to lengthen a back focus of the main lens group, the main point of the third lens group G3 is required to be positioned as close as possible to the light valve side. For this purpose, the fifth lens L5 and the sixth lens L6 is cemented to be a positive meniscus lens having a concave face on the screen side, whereby the positive power of the eighth lens L8 is increased. When the third lens group G3 includes four lenses, various aberrations of the entire system can be corrected in a well-balanced manner.

When it is attempted to increase a back focus ratio of the main lens group as in the present invention, the radius of curvature of the concave face of the negative lens of the first lens group G1 becomes small, so that a Petzval sum is likely to be excessively corrected. In order to avoid this, it is preferred that the negative lens be prescribed to have a low refractive index and the positive lens be prescribed to have a high refractive index in the first and second lens groups. This makes it possible to select relatively less expensive glass material as the negative lenses used for the first lens group G1 and the second lens group G2 which have large effective apertures. This is advantageous in terms of cost.

The fourth lens group G4 is positioned with large space between the fourth lens group G4 and the third lens group G3. As described later, a color combining optical system (dichroic mirror and plane mirror) is placed in space between the third lens group G3 and the fourth lens group G4. The fourth lens group G4 has a function of further converging converged light which have passed through the third lens group G3 and allows a sufficient F-number to be obtained without increasing an outside diameter of the third lens group. The fourth lens group G4 has a function of allowing each principal ray of off-axis light to be almost parallel with the optical axis in the polarizer-beam splitter P, thereby making telecentricity satisfactory.

Since it becomes difficult to place two dichroic mirrors and a plane mirror for combining color when the full length of the fourth lens group G4 is large, the fourth lens group G4 is composed of one lens having a positive power with a convex face on the screen side and its outer periphery is in a rectangular shape. Furthermore, the fourth lens group G4 makes the correction of negative distortion generated in the main lens group more satisfactory and enhance telecentricity, so that the convex face on the screen side is made an aspherical face. The face of the fourth lens group G4 on the light valve side is made flat. This is because the fourth lens group G4 is connected to the polarizer-beam splitter (prism) P, whereby they are assembled easily with good precision when being incorporated into a lens tube. The lens of the fourth lens group G4 can be made of acrylic resin and molded in order to enhance mass production.

Figure 7:
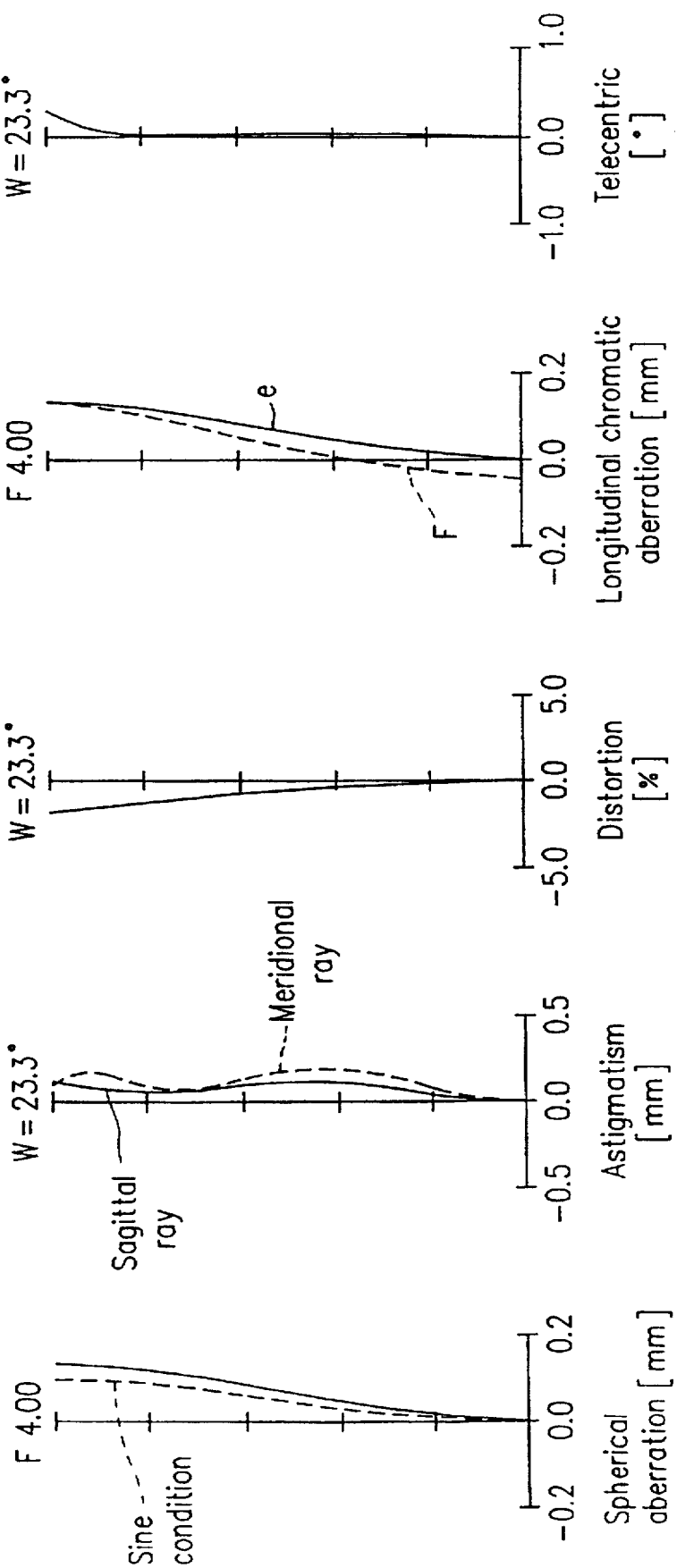
FIGS. 7A through 7E are diagrams showing aberrations of the projection lens of the first example according to the present invention.

FIGS. 7A through 7D show aberrations of the projection lens 310 having the lens data shown in Table 1. FIG. 7E shows telecentricity in the polarizer-beam splitter P. Each aberration diagram shows the case where light having a standard wavelength of e-rays (546.07 nm) is used. In FIG. 7A, a horizontal axis represents an aberration amount; a vertical axis represents an F-number; a solid line represents spherical aberration; and a broken line represents a sine condition. In FIG. 7B, a horizontal axis represents an amount of field of curvature; a vertical line represents an angle of view; a solid line represents a sagittal ray; and a broken line represents a meridional ray. The difference between the solid line and the broken line represents astigmatism. In FIG. 7C, a horizontal axis represents a distortion amount and a vertical axis represents an angle of view. In FIG. 7D, a horizontal axis represents a distortion amount; a vertical axis represents an F-number; a solid line represents an e-ray; and a broken line represents an F-ray (486.13 nm). The difference between the solid line and the broken line represents longitudinal chromatic aberration-on the e-ray and the F-ray. In FIG. 7E, a horizontal axis represents an angle formed by the principal ray and the optical axis, and a vertical axis represents an angle of view. These aberration diagrams include aberrations caused in the prism P as a polarizer-beam splitter and the glass substrate LV on the output side of the reflection light valve.

As is understood from FIGS. 7A through 7E, various aberrations of the projection lens 310 are corrected in a well-balanced manner. The projection lens 310 has a semi-field angle ω of 23.3° and an F-value of 4.0. This is a sufficient level for projection display apparatuses using a reflection light valve. The telecentricity of FIG. 7E represents an angle in the air on the reflection light valve side, which becomes smaller in the polarizer-beam splitter P. As is understood from FIG. 7E, the angle formed by the principal ray passing though the polarizer-beam splitter P and the optical axis is ±0.3° or less in the effective display region. Furthermore, the aperture ratio of the projection lens 310 at the maximum angle of view is 90% or more, and the sufficient peripheral light amount is obtained.

In order to place the color combining optical system including two dichroic mirrors and one plane mirror and the polarizer-beam splitter in the substantial back focus in the main lens group of the first lens group G1 to the third lens group G3, it is desired that the condition represented by the following Formula (5), which has been described above, is satisfied. In Formula (5), f is a combined focal length of the entire lens system, $d_{G3}$ an air interval between the third lens group G3 and the fourth lens group G4, and $d_P$ a reduced optical path scaled in the air in the polarizer-beam splitter P.

$$4.0 \leq \frac{(d_{G3} + d_P)}{f} \leq 5.0 \quad (5)$$

In the projection lens 310 of the first example, the auxiliary lens which is the fourth lens group G4 is placed in the back focus of the main lens group so as to satisfy the condition of Formula (5). Thus, the projection lens 310 has sufficient space capable of accommodating the above-mentioned color combining optical system and the polarizer-beam splitter.

Next, another example of the projection lens of the present invention will be described.

Figure 8:
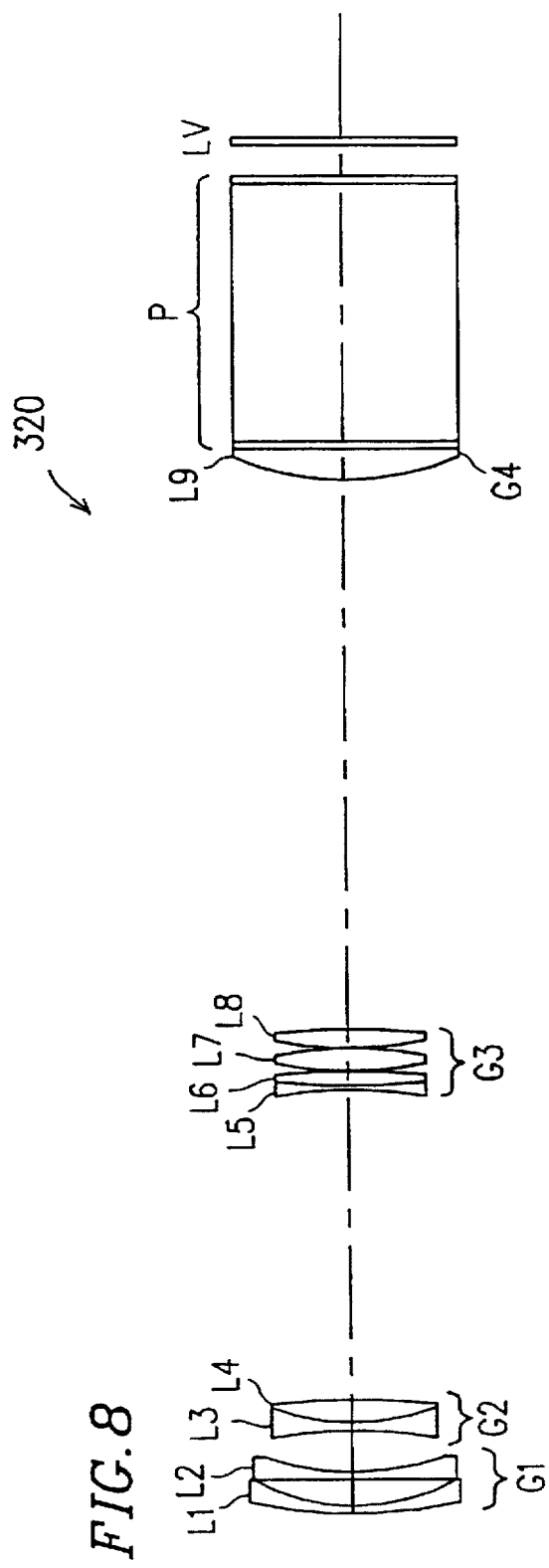
FIG. 8 is a cross-sectional structural view of a projection lens of the second example according to the present invention.
Figure 9:
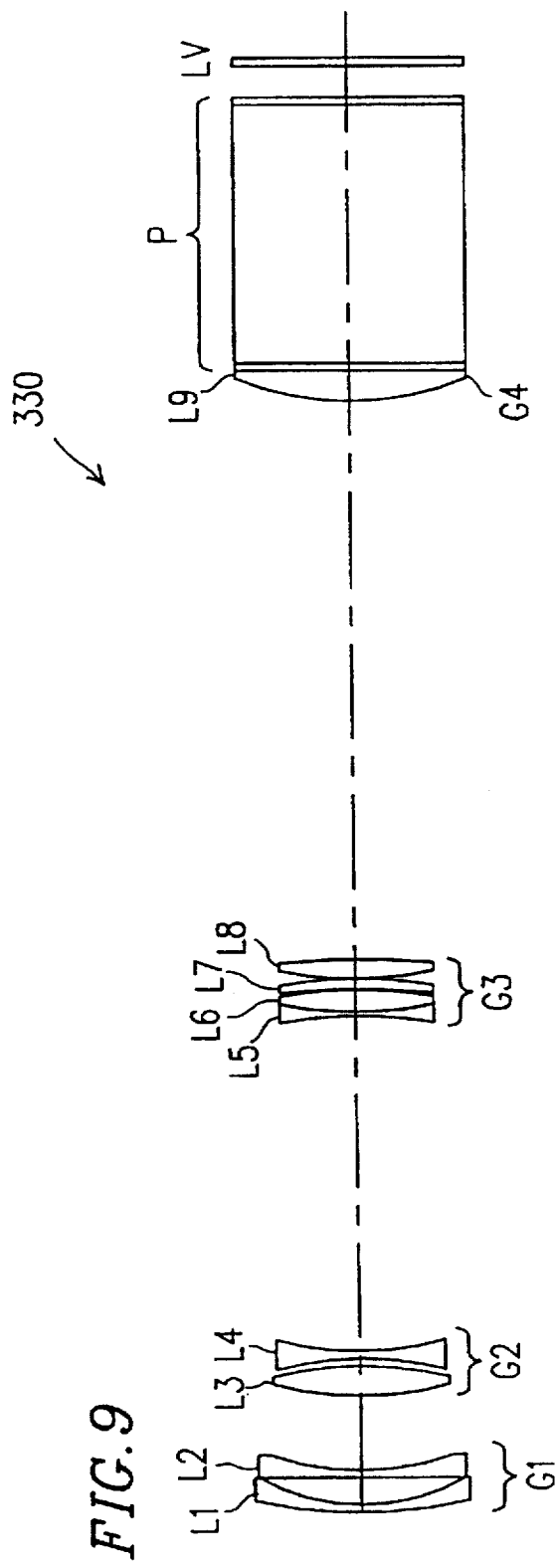
FIG. 9 is a cross-sectional structural view of a projection lens of the third example according to the present invention.
Figure 10:
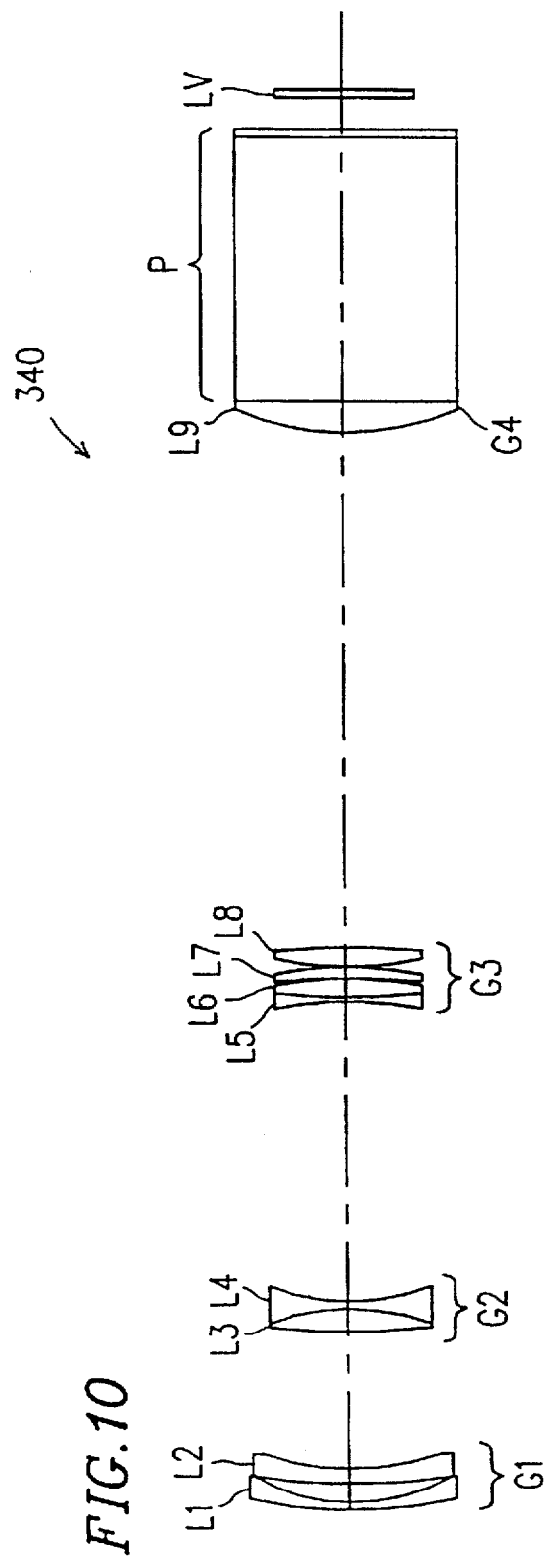
FIG. 10 is a cross-sectional structural view of a projection lens of the fourth example according to the present invention.
Figures 12A, 12B, 12C, 12D, 12E:
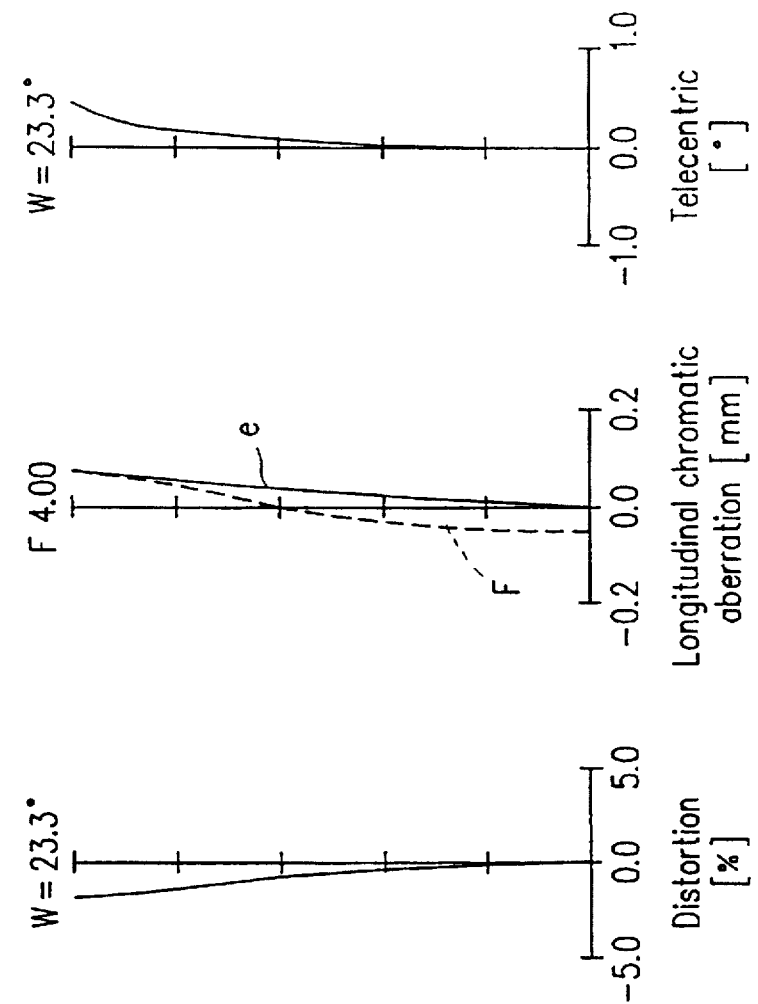
FIGS. 12A through 12E are diagrams showing aberrations of the projection lens of the third example according to the present invention.

FIGS. 8, 9, and 10 show structures of projection lenses 320, 330, and 340 of the second, third, and fourth examples, respectively. Specific numerical values respectively representing lens data of each lens of the projection lenses 320, 330, and 340 are shown in Tables 2, 3, and 4. FIGS. 11A through 11E, 12A through 12E, and 13A through 13E are respective aberration views of the projection lenses 320, 330, and 340. Reference numerals and symbols in each figure and table are the same as those in the first example.

TABLE 2

| f = 77.940 | F = 4.0 | ω = 23.7° | m = −40.01 | |
|---|---|---|---|---|
| G1 | $r_1$ = 549.654 | $d_1$ = 3.00 | $n_1$ = 1.51825 | $v_1$ = 64.1 |
| | $r_2$ = 70.182 | $d_2$ = 10.00 | | |
| | $r_3$ = ∞ | $d_3$ = 3.00 | $n_3$ = 1.59143 | $v_3$ = 61.0 |
| | $r_4$ = 112.813 | $d_4$ = 20.87 | | |
| G2 | $r_5$ = −212.365 | $d_5$ = 2.50 | $n_5$ = 1.59143 | $v_5$ = 61.0 |
| | $r_6$ = 90.750 | $d_6$ = 12.00 | $n_6$ = 1.79191 | $v_6$ = 25.7 |
| | $r_7$ = −454.393 | $d_7$ = 129.06 | | |
| G3 | $r_8$ = −183.541 | $d_8$ = 2.00 | $n_8$ = 1.79191 | $v_8$ = 25.7 |
| | $r_9$ = 431.921 | $d_9$ = 8.50 | $n_9$ = 1.51825 | $v_9$ = 64.1 |
| | $r_{10}$ = −130.503 | $d_{10}$ = 0.34 | | |
| | $r_{11}$ = 1263.663 | $d_{11}$ = 6.70 | $n_{11}$ = 1.51825 | $v_{11}$ = 64.1 |
| | $r_{12}$ = −188.283 | $d_{12}$ = 0.20 | | |
| | $r_{13}$ = 159.640 | $d_{13}$ = 7.40 | $n_{13}$ = 1.51825 | $v_{13}$ = 64.1 |
| | $r_{14}$ = −5902.960 | $d_{14}$ = 237.00 | | |
| G4 | $r_{15}$ = 108.262* | $d_{15}$ = 12.00 | $n_{15}$ = 1.49383 | $v_{15}$ = 57.2 |
| | $r_{16}$ = ∞ | $d_{16}$ = 0.20 | $n_{16}$ = 1.40000 | $v_{16}$ = 51.9 |
| P | $r_{17}$ = ∞ | $d_{17}$ = 2.00 | $n_{17}$ = 1.51825 | $v_{17}$ = 64.1 |
| | $r_{18}$ = ∞ | $d_{18}$ = 109.00 | $n_{18}$ = 1.44150 | $v_{18}$ = 63.1 |
| | $r_{19}$ = ∞ | $d_{19}$ = 2.00 | $n_{19}$ = 1.51825 | $v_{19}$ = 64.1 |
| | $r_{20}$ = ∞ | $d_{20}$ = 12.00 | | |
| L V | $r_{21}$ = ∞ | $d_{21}$ = 2.20 | $n_{21}$ = 1.51825 | $v_{21}$ = 64.1 |
| | $r_{22}$ = ∞ | | | |

Aspherical constants
$\kappa_{15}$=−1.28992×10 $\alpha_{15}$=1.04258×10$^{-6}$ $\beta_{15}$=−4.27780×10$^{-10}$
$\gamma_{15}$=1.23588×10$^{-13}$ $\delta_{15}$=−1.75548×10$^{-17}$
$f_{G1}/f$=−1.063 $f_{G2}/f$=10.773 $f_{G3}/f$=2.166
$f_{G4}/f$=2.813 $f_{G1}f_{G2}/[f(f_{G1}+f_{G2})]$=−1.180
$d_{G1}/f$=0.268 $d_{G2}/f$=1.656 $d_{G3}/f_{G4}$=1.081 $(d_{G3}+d_{GP})/f$=4.045

TABLE 3

| f = 78.344 | F = 4.0 | ω = 23.3° | m = −39.99 | |
|---|---|---|---|---|
| G1 | $r_1$ = 238.400 | $d_1$ = 3.00 | $n_1$ = 1.51825 | $v_1$ = 64.1 |
| | $r_2$ = 77.215 | $d_2$ = 10.00 | | |
| | $r_3$ = 947.809 | $d_3$ = 3.00 | $n_3$ = 1.59143 | $v_3$ = 61.0 |
| | $r_4$ = 106.298 | $d_4$ = 29.02 | | |
| G2 | $r_5$ = 180.157 | $d_5$ = 11.00 | $n_5$ = 1.79191 | $v_5$ = 25.7 |
| | $r_6$ = −160.423 | $d_6$ = 2.87 | | |
| | $r_7$ = −201.450 | $d_7$ = 2.50 | $n_7$ = 1.59143 | $v_7$ = 61.0 |
| | $r_8$ = 95.543 | $d_8$ = 150.78 | | |
| G3 | $r_9$ = −155.784 | $d_9$ = 2.00 | $n_9$ = 1.79191 | $v_9$ = 25.7 |
| | $r_{10}$ = 1482.417 | $d_{10}$ = 8.50 | $n_{10}$ = 1.51825 | $v_{10}$ = 64.1 |
| | $r_{11}$ = −129.924 | $d_{11}$ = 0.40 | | |
| | $r_{12}$ = −454.418 | $d_{12}$ = 6.70 | $n_{12}$ = 1.51825 | $v_{12}$ = 64.1 |
| | $r_{13}$ = −152.184 | $d_{13}$ = 0.20 | | |
| | $r_{14}$ = 231.664 | $d_{14}$ = 8.60 | $n_{14}$ = 1.51825 | $v_{14}$ = 64.1 |
| | $r_{15}$ = −253.481 | $d_{15}$ = 237.00 | | |
| G4 | $r_{16}$ = 114.813* | $d_{16}$ = 12.00 | $n_{16}$ = 1.49383 | $v_{16}$ = 57.2 |
| | $r_{17}$ = ∞ | $d_{17}$ = 0.20 | $n_{17}$ = 1.40000 | $v_{17}$ = 51.9 |
| P | $r_{18}$ = ∞ | $d_{18}$ = 2.00 | $n_{18}$ = 1.51825 | $v_{18}$ = 64.1 |
| | $r_{19}$ = ∞ | $d_{19}$ = 109.00 | $n_{19}$ = 1.44150 | $v_{19}$ = 63.1 |
| | $r_{20}$ = ∞ | $d_{20}$ = 2.00 | $n_{20}$ = 1.51825 | $v_{20}$ = 64.1 |
| | $r_{21}$ = ∞ | $d_{21}$ = 12.00 | | |
| L V | $r_{22}$ = ∞ | $d_{22}$ = 2.20 | $n_{22}$ = 1.51825 | $v_{22}$ = 64.1 |
| | $r_{23}$ = ∞ | | | |

Aspherical constants
$\kappa_{16}$=−7.24454 $\alpha_{16}$=4.56346×10$^{-7}$ $\beta_{16}$=−8.90550×10$^{-11}$ $\gamma_{16}$= 7.88822×10$^{-15}$ $\delta_{16}$=−1.62184×10$^{-19}$ $f_{G1}/f=-1.317$  $f_{G2}/f=20.480$  $f_{G3}/f=2.249$
$f_{G4}/f=2.968$  $f_{G1}f_{G2}/|f(f_{G1}+f_{G2})|=-1.408$
$d_{G1}/f=0.370$  $d_{G2}/f=1.925$  $d_{G3}/f_{G4}=1.019$  $(d_{G3}+d_{GP})/f=4.024$

TABLE 4

| f = 74.799 | F = 4.0 | ω = 23.8° | m = −40.05 | | |
|---|---|---|---|---|---|
| G1 | $r_1$ = 174.721 | $d_1$ = 4.00 | $n_1$ = 1.51825 | $v_1$ = 64.1 | |
|  | $r_2$ = 75.000 | $d_2$ = 12.04 | | | |
|  | $r_3$ = 480.000 | $d_3$ = 4.00 | $n_3$ = 1.59143 | $v_3$ = 61.0 | |
|  | $r_4$ = 115.783 | $d_4$ = 68.45 | | | |
| G2 | $r_5$ = 477.613 | $d_5$ = 12.00 | $n_5$ = 1.79191 | $v_5$ = 25.7 | |
|  | $r_6$ = −96.400 | $d_6$ = 3.50 | $n_6$ = 1.59143 | $v_6$ = 61.0 | |
|  | $r_7$ = 126.550 | $d_7$ = 157.10 | | | |
| G3 | $r_8$ = −151.669 | $d_8$ = 3.00 | $n_8$ = 1.79191 | $v_8$ = 25.7 | |
|  | $r_9$ = 1345.502 | $d_9$ = 8.50 | $n_9$ = 1.51825 | $v_9$ = 64.1 | |
|  | $r_{10}$ = −140.00 | $d_{10}$ = 0.34 | | | |
|  | $r_{11}$ = −1345.502 | $d_{11}$ = 6.70 | $n_{11}$ = 1.51825 | $v_{11}$ = 64.1 | |
|  | $r_{12}$ = −177.817 | $d_{12}$ = 0.20 | | | |
|  | $r_{13}$ = 249.379 | $d_{13}$ = 7.40 | $n_{13}$ = 1.51825 | $v_{13}$ = 64.1 | |
|  | $r_{14}$ = −294.832 | $d_{14}$ = 265.00 | | | |
| G4 | $r_{15}$ = 118.580* | $d_{15}$ = 12.00 | $n_{15}$ = 1.49383 | $v_{11}$ = 57.2 | |
| P | $r_{16}$ = ∞ | $d_{16}$ = 125.00 | $n_{16}$ = 1.44150 | $v_{16}$ = 63.1 | |
|  | $r_{17}$ = ∞ | $d_{17}$ = 2.00 | $n_{17}$ = 1.51825 | $v_{17}$ = 64.1 | |
|  | $r_{18}$ = ∞ | $d_{18}$ = 12.00 | | | |
| L V | $r_{19}$ = ∞ | $d_{19}$ = 1.10 | $n_{19}$ = 1.51825 | $v_{19}$ = 64.1 | |
|  | $r_{20}$ = ∞ | | | | |

Aspherical constants
$\kappa_{15}=-5.46066$  $\alpha_{15}=3.04901\times10^{-7}$  $\beta_{15}=-5.40460\times10^{-11}$  $\gamma_{15}=8.92473\times10^{-15}$  $\delta_{15}=-1.28088\times10^{-18}$
$f_{G1}/f=-1.682$  $f_{G2}/f=-15.390$  $f_{G3}/f=2.638$
$f_{G4}/f=3.210$  $f_{G1}f_{G2}/|f(f_{G1}+f_{G2})|=-1.516$
$d_{G1}/f=0.915$  $d_{G2}/f=2.100$  $d_{G3}/f_{G4}=1.104$  $(d_{G3}+d_{GP})/f=4.720$ In a projection lens 320 of the second example shown in FIG. 8, based on the projection lens 310 of the first example, the second lens group G2 is modified to include a negative lens and a positive lens sequentially from the screen side. In a projection lens 330 of the third example shown in FIG. 9, based on the projection lens 310 of the first example, two lenses in the second lens group G2 are separated from each other. In the projection lenses 320 and 330, the second lens group G2 has a weak positive power.

In a projection lens 340 of the fourth example shown in FIG. 10, based on the projection lens 310 of the first example, the back focus of the main lens group is made longer. In the projection lens 340, a negative power of the first lens group G1 is stronger than that of the projection lens 310, an interval $d_{G1}$ between the first lens group G1 and the second lens group G2 and an interval $d_{G2}$ between the second lens group G2 and the third lens group G3 are both longer than those of the projection lens 310.

In the projection lenses of the second, third, and fourth examples, the air interval between the second lens group G2 and the third lens group G3 is very large in the same way as in Example 1, and various aberrations are satisfactorily corrected, as is understood from FIGS. 11A through 11E, 12A through 12E, and 13A through 13E. In the projection lenses 320 to 340, the substantial back focus of the main lens group from the first lens group G1 to the third lens group G3 satisfies the condition of Formula (5).

Furthermore, in all of the examples described above, the angle formed by the principal ray passing through the polarizer-beam splitter P and the optical axis is ±0.5° or less in the effective display region. Thus, in the case where these projection lenses are used in a projection display apparatus described later, a projected image with even image quality can be displayed.

The focus of the projection lenses 310 to 340 of the above-mentioned examples can be adjusted by fixing the third lens group G3, the fourth lens group G4, and the polarizer-beam splitter P and simultaneously moving the first lens group G1 and the second lens group G2.

The projection lenses 310 to 340 of the above-mentioned examples are all characterized in that the air interval between the second lens group G2 and the third lens group G3 is large. As shown in FIG. 14, a plane mirror M can be placed in space between the second lens group G2 and the third lens group G3 so that the entire main lens group is in an L-shape.

The projection lens of the present invention has a structure in which the main lens group is very long. Therefore, in the case where the projection lens is used in a projection display apparatus, the apparatus can be made compact by configuring the projection lens in an L-shape as described above.

Figure 15:
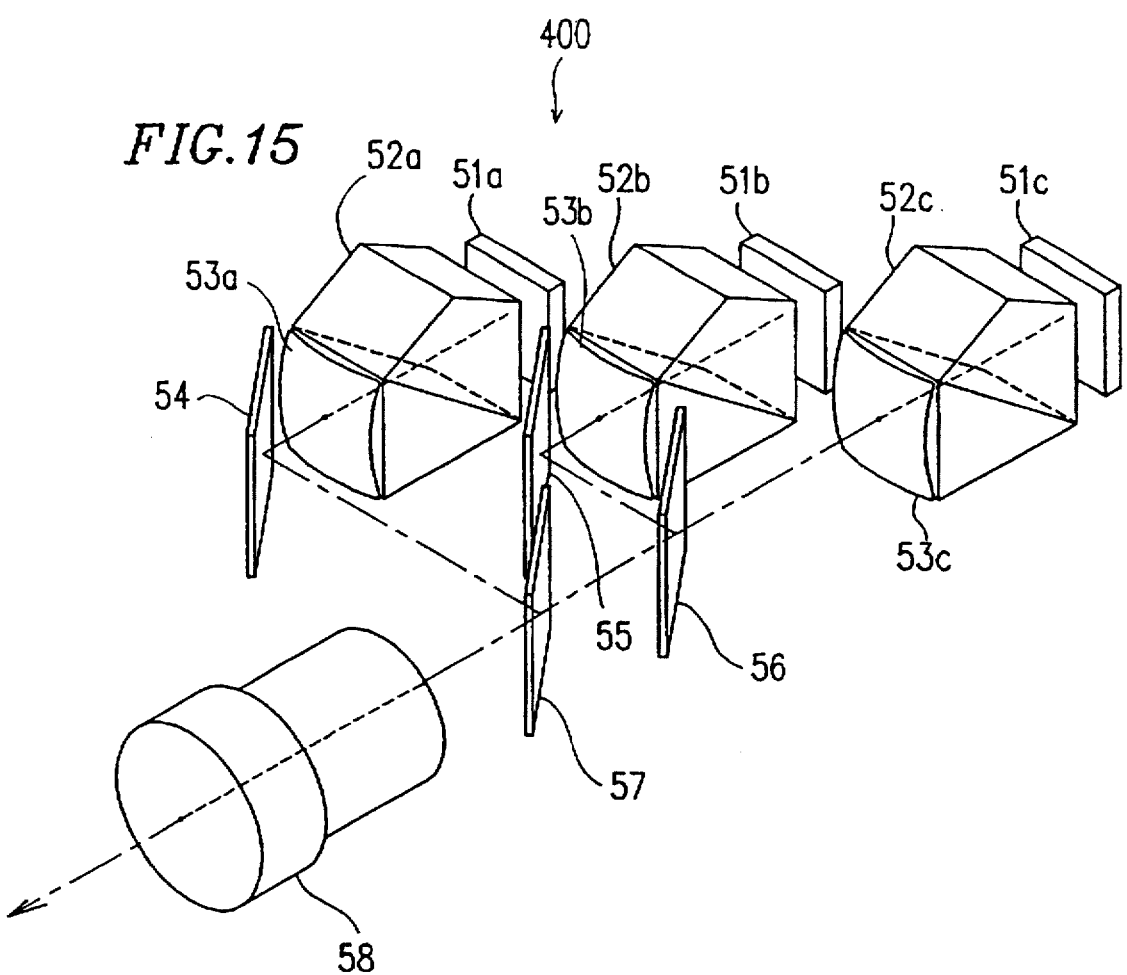
FIG. 15 is a perspective view showing a structure of a projection optical system of a projection display apparatus of one example according to the present invention.

FIG. 15 shows a structure of a projection lens 400 obtained by introducing a color combining optical system into the projection lens described in the above-mentioned respective examples, for use in a projection display apparatus using a refection light valve. As shown in FIG. 15, the projection lens 400 includes reflection light valves 51a, 51b, and 51c; polarizer-beam splitters 52a, 52b, and 52c; auxiliary lenses 53a, 53b, and 53c forming the fourth lens group G4; plane mirrors 54 and 55; dichroic mirrors 56 and 57; and a main lens group 58 from the first lens group G1 to the third lens group G3. All of the reflective faces of the plane mirrors 54 and 55 and the dichroic mirrors 56 and 57 are placed in parallel with each other.

The reflection light valves 51a to 51c, the polarizer-beam splitters 52a to 52c, and the auxiliary lenses 53a to 53c are respectively provided for red, green, and blue colors. The polarizer-beam splitters 52a to 52c are cemented to the corresponding auxiliary lenses 53a to 53c. In the projection lens 400 of the present invention, by realizing a long back focus, sufficient space capable of accommodating the plane mirrors 54 and 55 as well as the color combining optical system including the dichroic mirrors 56 and 57 is obtained. Thus, as shown in FIG. 15, the optical axes of the three auxiliary lenses 53a to 53c, polarizer-beam splitters 52a to 52c, and reflection light valves 51a to 51c can be made parallel with each other in the identical plane, and the light polarizing and splitting faces of the polarizer-beam splitters 52a to 52c can be made parallel with each other, so that the entire set of the projection display apparatus can be made compact in size.

As shown in FIG. 15, in the projection lens 400, three optical images formed by the reflection light valves 51a to 51c are combined into one image by the plane mirrors 54 and 55 and the dichroic mirrors 56 and 57 after passing through the polarizer-beam splitters 52a to 52c and the auxiliary lenses 53a to 53c, and is projected onto a screen (not shown) by the main lens group 58.

Hereinafter, the projection display apparatus of the present invention will be described by way of illustrative examples.

Figure 16:
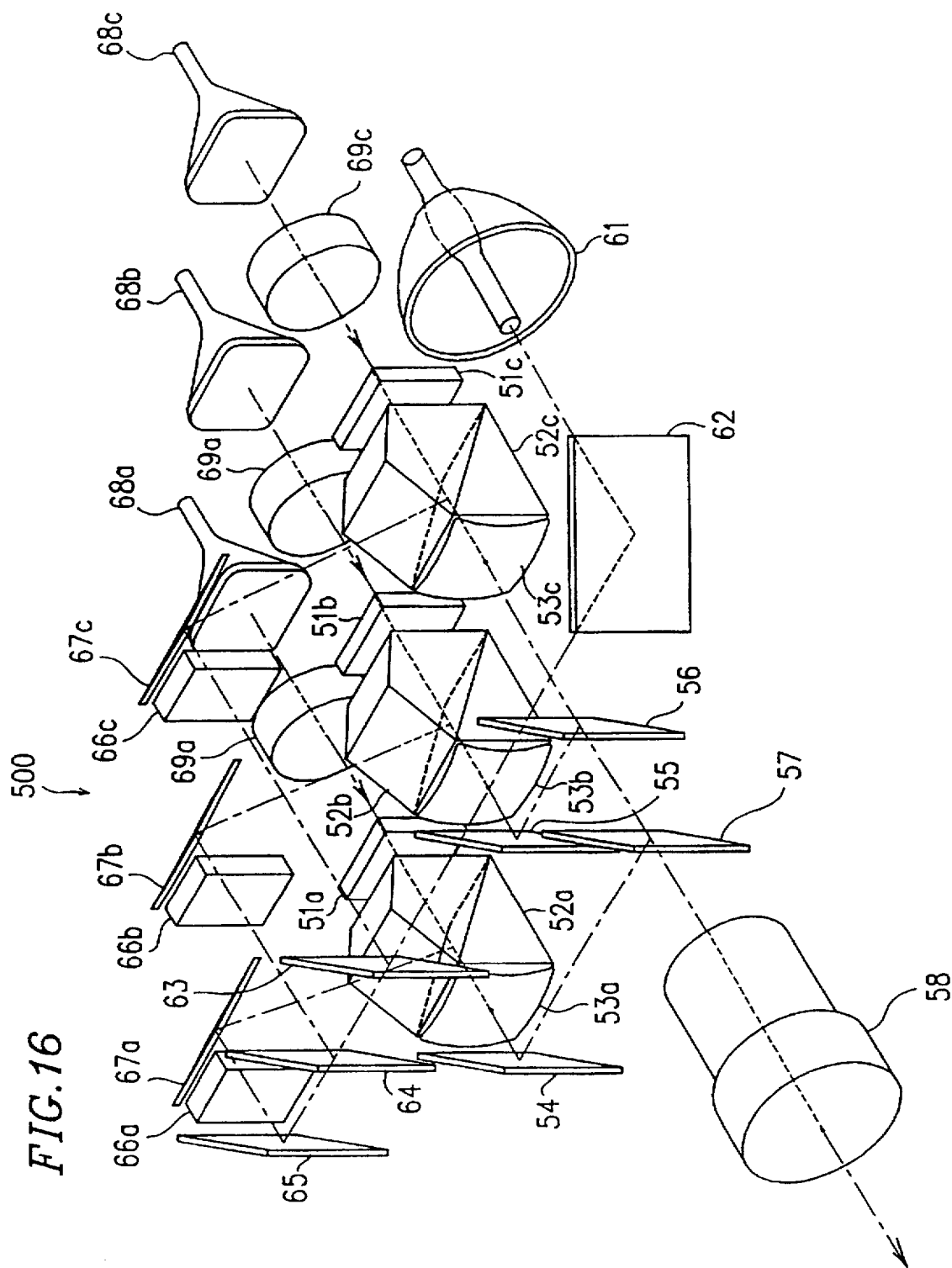
FIG. 16 is a perspective view showing a structure of a projection display apparatus of one example according to the present invention.

FIG. 16 shows a structure of a projection display apparatus 500 of one example according to the present invention. In the projection display apparatus 500, the reflection light valves 51a, 51b, and 51c; the polarizer-beam splitters 52a, 52b, and 52c; the auxiliary lenses 53a, 53b, and 53c; the plane mirrors 54 and 55; and the dichroic mirrors 56 and 57; and the main lens group 58 are the same as those in the projection lens 400 shown in FIG. 15.

Figure 1:
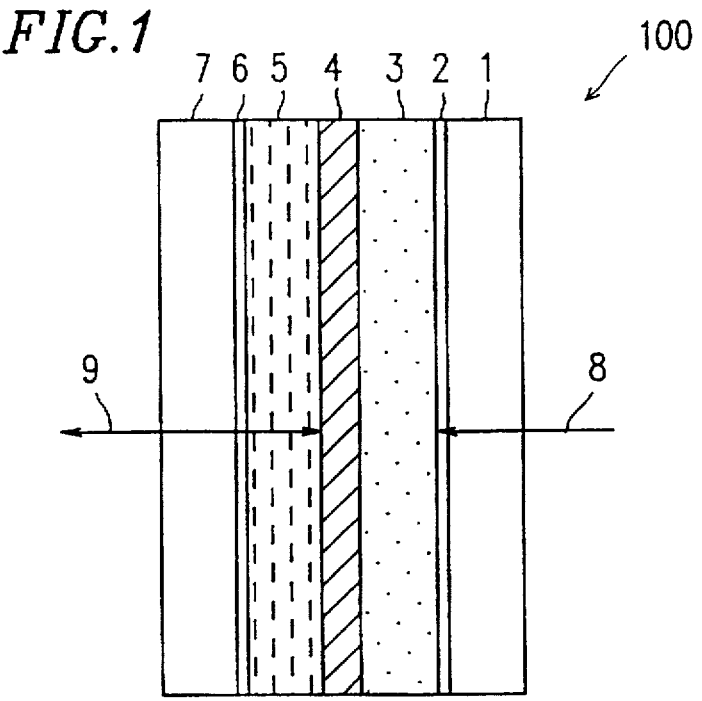
FIG. 1 is a schematic cross-sectional view showing a fundamental structure of a reflection light valve.
Figure 2:
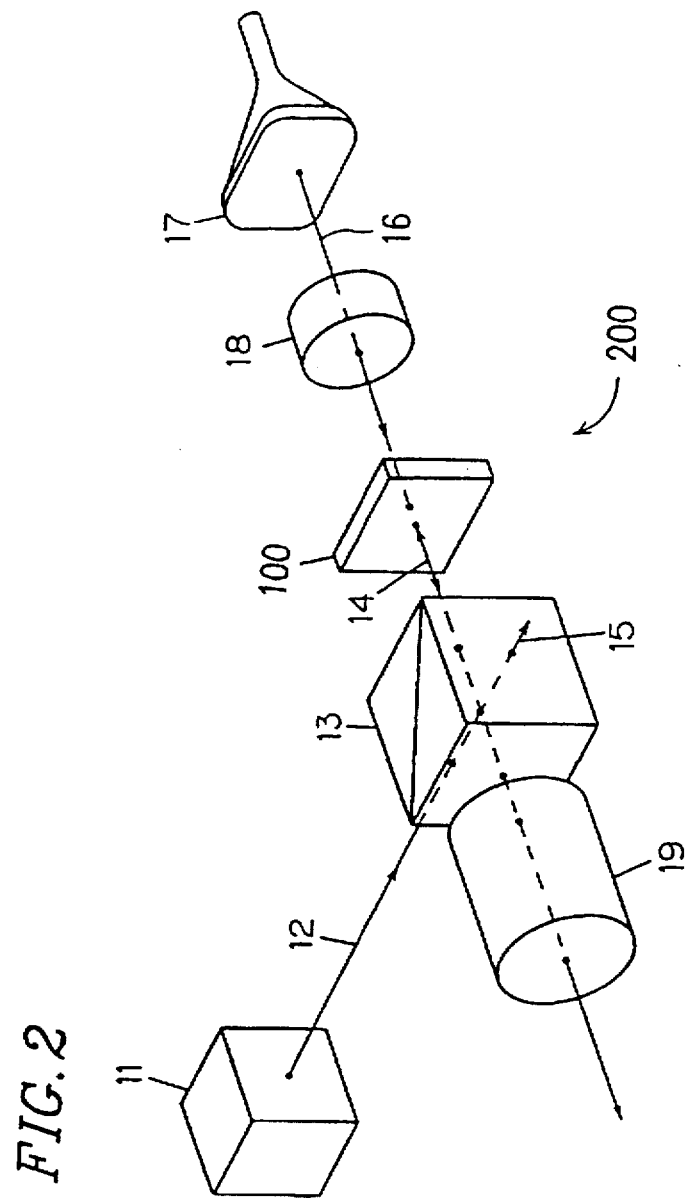
FIG. 2 is a perspective view showing a fundamental structure of a projection display apparatus using a reflection light valve.

In the projection display apparatus 500, a light source 61 radiates light containing three primary color components. A cold mirror 62 reflects visible light and transmits infrared rays. Among the light radiated from the light source 61, only visible light is reflected by the cold mirror 62, and the reflected light is separated into primary color light beams of red, green, and blue by a color separation optical system composed of three dichroic mirrors 63, 64, and 65. The primary color light beams are incident upon pre-polarizers 66a, 66b, and 66c, and are output therefrom as substantially linear polarized light beams. The primary color light beams which become substantially linear polarized light beams are incident upon the polarizer-beam splitters 52a, 52b, and 52c as reading light through mirrors 67a, 67b, and 67c, and are reflected to the corresponding reflection light valves 51a, 51b, and 51c. The reflection light valves 51a to 51c have fundamental structures similar to that of the reflection light valve 100 shown in FIG. 1.

On the other hand, in the projection display apparatus 500, CRTs 68a, 68b, and 68c and write lenses 69a, 69b, and 69c are constructed as optical writing means. Images (writing light) formed on the CRTs 68a to 68c are formed as write images on light conductive layers of the corresponding reflection light valves 51a to 51c by the write lenses 69a to 69c. Each of the reflection light valves 51a to 51c modulates a reading light beam (linear polarized light beam) which is incident upon a liquid crystal layer (light modulation layer) into an elliptically polarized light beam in accordance with the image formed on the light conductive layer. The modulated reading light beams are reflected by light reflective layers of the reflection light valves 51a to 51c and are incident upon the polarizer-beam splitters 52a to 52c again. Polarized light components reflected by the polarizer-beam splitters 52a to 52c travel to the light source 61, and polarized light components transmitted through the polarizer-beam splitters 52a to 52c are incident upon the auxiliary lenses 53a to 53c.

Output light beams from the auxiliary lenses 53a to 53c are combined into one light beam by a color combining optical system including the plane mirrors 54 and 55 and the dichroic mirrors 56 and 57. The combined light beam is incident upon the main lens group 58. The main lens group 58 includes a first lens group, a second lens group, and a third lens group sequentially from a screen (not shown) side. These lens groups correspond to the first lens group G1, the second lens group G2, and the third lens group G3 in the projection lenses 310 to 340 of the present invention shown in FIG. 6 and the like. The auxiliary lenses 53a, 53b, and 53c are identical with each other, and correspond to the fourth lens group G4 in the projection lenses 310 to 340. The optical images on the three reflection light valves 51a to 51c are magnified and projected onto a screen (not shown) positioned far away from the reflection light valves 51a to 51c by the main lens group 58 and the auxiliary lenses 53a to 53c.

The main lens group 58, the plane mirrors 54 and 55 for combining color, the dichroic mirrors 56 and 57, and three auxiliary lenses 53a to 53c respectively cemented to the polarizer-beam splitters 52a to 52c can be accommodated in one lens tube. This enables the optical system from the auxiliary lenses 53a to 53c to the main lens group 58 to be assembled with good precision. The plane mirrors 54 and 55, and the dichroic mirrors 56 and 57 are included in the structure of the projection lens of the present invention.

Figure 17:
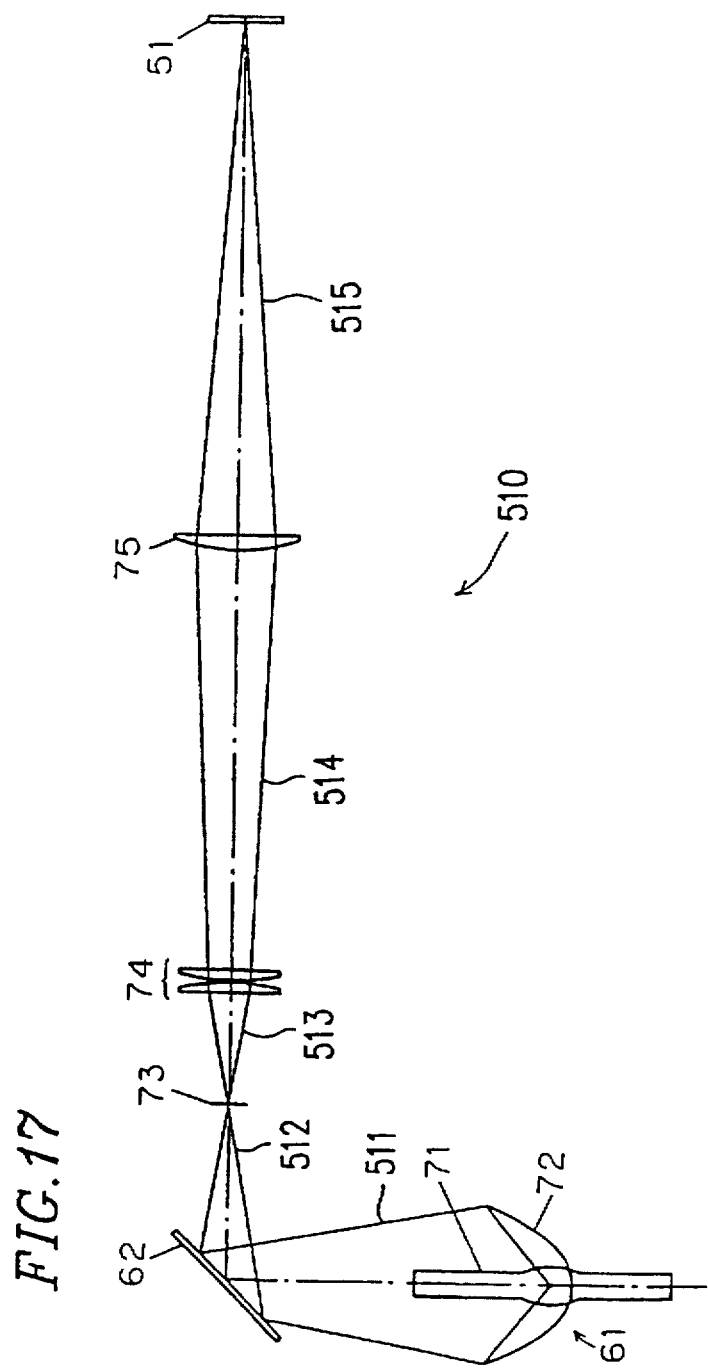
FIG. 17 is a schematic structure of an illuminating optical system of a projection display apparatus of one example according to the present invention.

Next, referring to FIG. 17, the structure of a illuminating optical system 510 will be described. Although not shown in FIG. 16, preferably a first relay lens 74 and a second relay lens 75 are placed in an optical path of the light which is output from a light source 61 and travels to irradiate a reflection light valve 51, as shown in FIG. 17. The reflection light valve 51 is the same as the reflection light valves 51a to 51c shown in FIG. 15.

Although not shown in FIG. 17, the dichroic mirrors 63 to 65 (color separation optical system), the pre-polarizers 66a to 66c, and the mirrors 67a to 67c shown in FIG. 16 are placed between the first relay lens 74 and the second relay lens 75, and the polarizer-beam splitters 52a to 52c are placed between the second relay lens 75 and the reflection light valve 51. The light source 61 includes a lamp 71 and an ellipsoidal mirror 72. The lamp 71 is a xenon lamp which emits light containing three primary color components. The ellipsoidal mirror 72 is made of glass and its reflective face is coated with an aluminum thin film. A multi-layer film which transmits infrared rays and reflects visible light can be vapor-deposited on a light reflective face of the ellipsoidal mirror 72.

As shown in FIG. 17, light 511 is output from the lamp 71 and reflected by the ellipsoidal mirror 72. Infrared rays contained therein are removed by a cold mirror 62, and focused at a second focal point 73 of the ellipsoidal mirror 72. The focusing light 512 passes through the second focal point 73 to be diverging light 513, and converted into nearly parallel light 514 by the first relay lens 74. Since dichroic mirrors using a dielectric multi-layer film have the characteristic that their spectroscopic performance changes depending upon incident angle of a light beam, it is desired that light passing through a dichroic mirror is as parallel as possible. The nearly parallel light 514 is focused (light 515) again by the second relay lens 75 and illuminates the reflection light valve 51. The relay lenses 74 and 75 serve to efficiently illuminate an image of the lamp 71 formed on the second focal point 73 of the ellipsoidal mirror 72 with a magnification corresponding to the effective display region of the reflection light valve 51.

Although the first relay lens 74 is composed of two lenses in FIG. 17, it can be composed of one or three or more lenses. The second relay lens 75 can be provided between the color separation optical system (dichroic mirrors 63 to 65) and the pre-polarizers 66a to 66c or between the pre-polarizers 66a to 66c and the mirrors 67a to 67c for directing a light beam to the polarizer-beam splitters 52a to 52c, shown in FIG. 16. Furthermore, although a xenon lamp is used as the lamp 71 in the present example, a metal halide lamp, a halogen lamp, or the like can be used.

Figure 18:
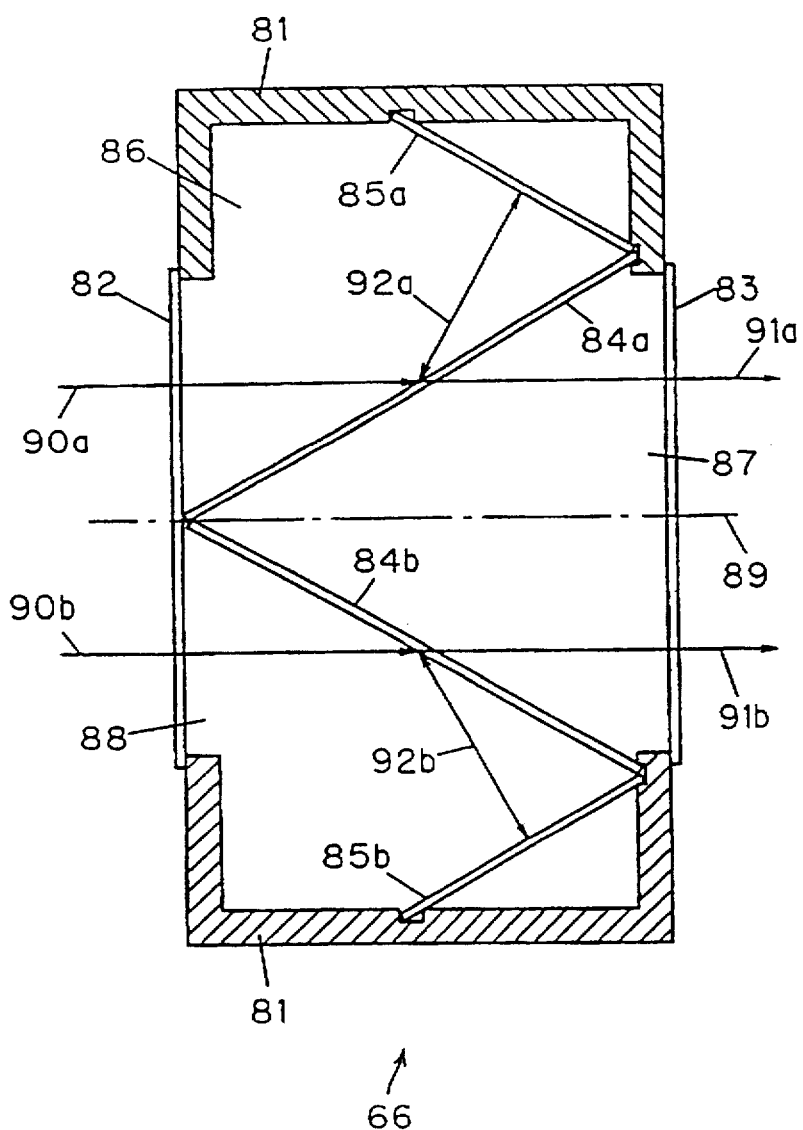
FIG. 18 is a cross-sectional view showing a structure of a pre-polarizer of a projection display apparatus of one example according to the present invention.

Hereinafter, the detailed structure of a pre-polarizer 66 will be described with reference to FIG. 18. The pre-polarizer 66 is the same as the pre-polarizers 66a, 66b, and 66c shown in FIG. 16. As shown in FIG. 18, in the pre-polarizer 66, liquid 86, 87, and 88 is sealed in a frame 81 having an incident window 82 and an output window 83 made of a glass substrate.

The frame 81 has zigzag grooves formed inside thereof, and respective ends of polarization splitting mirrors 84a and 84b having polarization selectivity and mirrors 85a and 85b are inserted into the grooves, whereby cross-sections of the mirrors 84a, 84b, 85a, and 85b form a zigzag shape. The space of a container formed by the frame 81, the incident window 82, the output window 83, the polarization splitting mirrors 84a and 84b, and the mirrors 85a and 85b is filled with the liquid 86 to 88. The polarization splitting mirrors 84a and 84b are formed by vapor-depositing a dielectric multi-layer film on a glass substrate. The faces of the dielectric multi-layer films of the polarization splitting mirrors 84a and 84b come into contact with the liquid 86, 87, and 88 which is sealed in the surrounding thereof so as to exhibit polarization splitting characteristics.

The liquid 86 to 88 used in the pre-polarizer 66 is required to be transparent, to have uniform optical characteristics, a low freezing point and a high boiling point, and to be less expensive. In the present example, as liquid sufficiently satisfying this condition, a solution containing three kinds of liquid: 55% by weight of ethylene glycol, 30% by weight of diethylene glycol, and 15% by weight of glycerine is used. This solution has a freezing point of −52° C., a boiling point of +198° C. and good optical performance. Thus, it is satisfactorily used in the projection display apparatus of the present example. Furthermore, this solution is less expensive, so that it is much more advantageous in terms of weight and cost, as compared with a glass prism.

Besides the above solution, as the liquid used in the pre-polarizer 66, a solution containing the above-mentioned three kinds of liquid in a modified mixture ratio with ethylene glycol as its main component; pure ethylene glycol; an aqueous solution of ethylene glycol; or the like can be used. It is noted that care should be taken, in the case where the frame 81 is made of aluminum, because aluminum reacts with water to deposit aluminum oxide, thereby gradually making the liquid turbid. Furthermore, materials, which are liquid during assembly but become solids or gels after assembly (e.g., gel-shaped transparent silicone resin KE1051 produced by Shin-Etsu Chemical Co, Ltd.), can be used.

The polarization splitting mirrors 84a and 84b are formed by vapor-depositing a dielectric multi-layer film on a glass substrate, in which a low refractive layer and a high reflective layer are alternately formed. The polarization splitting mirrors 84a and 84b are of the type utilizing Brewster's angle at which transmittance of P-polarized light becomes maximum and an interference effect of the dielectric multi-layer film. An optimum incident angle $\theta_M$ of a light beam of this type of polarization splitting mirror is obtained by the following Formula (7):

$$\sin^2\theta_M = \frac{(n_L n_H)^2}{n_M^2(n_L^2 + n_H^2)} \quad (7)$$

where $n_M$ denotes the refractive index of an external medium, $n_L$ denotes the refractive index of the low refractive layer, and $n_H$ denotes the refractive index of the high refractive layer.

By increasing the number of layers of the dielectric multi-layer film while satisfying the condition of Formula (7), the reflectivity of S-polarized light can be increased while transmittance of P-polarized light is retained at about 100%.

The polarization splitting mirrors 84a and 84b of the present example use magnesium fluoride as a low refractive layer (refractive index: 1.39) and titanium dioxide as a high refractive layer (refractive index: 2.30). Since the refractive index of the liquid 86 to 88 is 1.4415, the optimum light beam incident angle becomes 55.60° from Formula (7). Thus, the polarization splitting mirrors 84a and 84b are inclined so that the angle with respect to the optical axis 89 becomes 34.4°. In this example, the dielectric multi-layer film includes thirteen layers. The film thickness of the dielectric multi-layer film is set so that the reflection peak of S-polarized light becomes each central wavelength of three primary color light to be incident.

By forming dielectric multi-layer films on both sides of the glass substrates of the polarization splitting mirrors 84a and 84b to have different reflection wavelength bands of an S-polarized light component (for example, the first dielectric multi-layer film on one side and the second dielectric multi-layer film on the other side), the total reflection wavelength band of S-polarized light can be widened. This enables the pre-polarizer 66 to satisfactorily function even in the case where light having a wide-band wavelength is incident. Thus, in place of three pre-polarizers 66a to 66c as shown in FIG. 16, one pre-polarizer can be used by being placed between the cold mirror 62 and the dichroic mirror 57.

In the polarization splitting mirror of the above-mentioned type, the wavelength band for reflecting S-polarized light can be made wider by enlarging the difference in refractive index between the low refractive layer and the high refractive layer included in the dielectric multi-layer film. In the polarization splitting mirrors 84a and 84b of the present example, in order to widen the reflection wavelength band of an S-polarized light component as much as possible, magnesium fluoride and titanium dioxide are used, which have the lowest refractive index and the highest refractive index, respectively, among transparent materials with outstanding durability. However, thin film materials having another refractive index can be used. For example, silicon dioxide (refractive index: 1.46), aluminum trioxide (refractive index: 1.62), or the like can be used for the low refractive layer. Similarly, zinc sulfide (refractive index: 2.30), cerium dioxide (refractive index: 2.30), zirconium dioxide (refractive index: 2.05), tantalum pentoxide (refractive index: 2.10), hafnium dioxide (refractive index: 2.00), or the like can be used for the high refractive layer. In the case of using these materials, the light polarization splitting mirrors 84a and 84b are also required to be inclined so as to satisfy the condition of Formula (7).

As shown in FIG. 18, natural light beams 90a and 90b which are vertically incident upon the pre-polarizer 66, pass through the incident window 82 and the liquid 86 and 88, respectively, and are incident upon the polarization splitting mirrors 84a and 84b at an angle of 55.6°. The natural light beams 90a and 90b are split into P-polarized light components 91a and 91b and S-polarized light components 92a and 92b by the polarization splitting mirrors 84a and 84b. The P-polarized light components 91a and 91b are output from the output window 83 after passing through the liquid 87. The S-polarized light components 92a and 92b are incident upon the mirrors 85a and 85b, respectively.

The mirrors 85a and 85b are placed so that S-polarized light components 92a and 92b are incident thereupon at an incident angle of 0° and the angles formed by the mirror 85a and the adjacent polarization splitting mirror 84a and by the mirror 85b and the adjacent polarization splitting mirror 84b are 55.6°, respectively. The S-polarized light components 92a and 92b reflected by the mirrors 85a and 85b are incident upon the polarization splitting mirrors 84a and 84b at an incident angle of 55.6°, and are reflected to the incident window 82. Due to this, the S-polarized light components 92a and 92b return to the incident window 82 through the same optical paths as those of the incident natural light beams 90a and 90b, so that only P-polarized light components 91a and 91b can be satisfactorily taken from the output window 83 side. Even in the case where natural light is incident upon the pre-polarizer 66 at a certain incident angle larger than 0°, the S-polarized light components of the off-perpendicular incident light is reflected by the polarization slitting mirrors 84a and 84b and the mirrors 85a and 85b to return to the incident window 82, so that the S-polarized light components are not output from the output window 83.

In order to make the pre-polarizer 66 compact in size, it is preferable that the number of the polarization splitting mirrors 84a and 84b and the mirrors 85a and 85b is two, respectively, and the polarization splitting mirrors 84a and 84b and the mirrors 85a and 85b are placed symmetrically with respect to the optical axis 89. In the case where one polarization splitting mirror and one mirror are used, the size in the optical axis direction increases and the incident angle dependence of light which is not perpendicularly incident upon the pre-polarizer 66 becomes non-symmetrical, resulting in a projected image which is likely to be adversely affected. In the case where three or more polarization splitting mirrors and three or more mirrors are used, it becomes difficult to place mirrors efficiently without allowing a part of mirrors to block incident light. As described above, nearly linear polarized light can be taken with good efficiency in the pre-polarizer 66 having the structure shown in FIG. 18.

Figure 19:
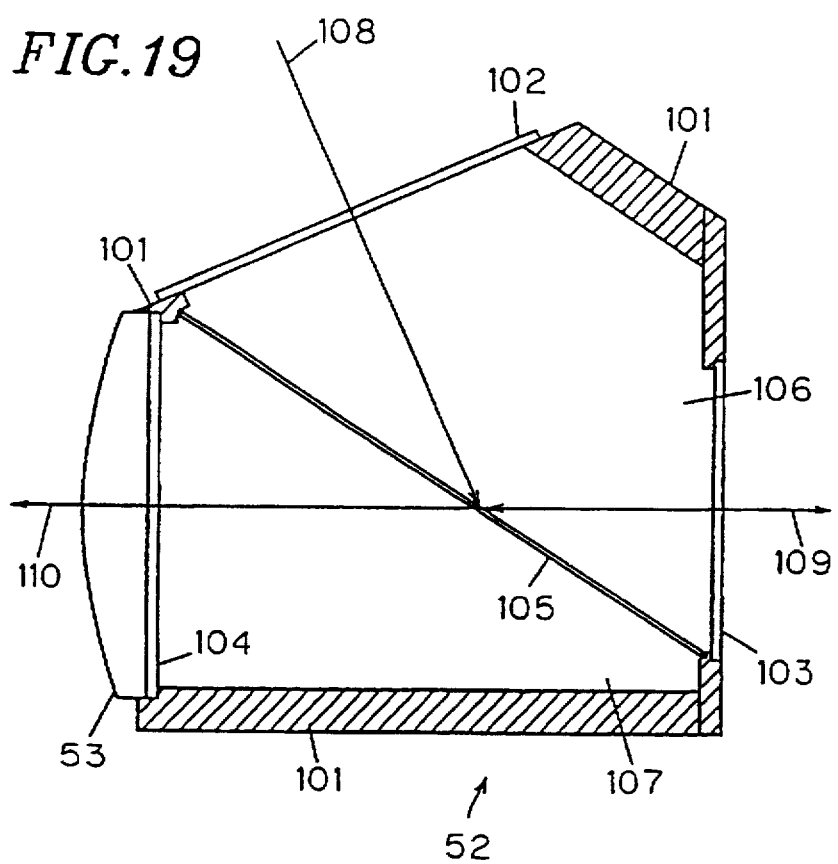
FIG. 19 is a cross-sectional view showing a structure of a polarizer-beam splitter of a projection display apparatus of one example according to the present invention.

Next, the detailed structure of a polarizer-beam splitter 52 will be described with reference to FIG. 19. The polarizer-beam splitter 52 and an auxiliary lens 53 are the same as the polarizer-beam splitters 52a to 52c and the auxiliary lenses 53a to 53c shown in FIG. 16, respectively. In FIG. 19, the reference numeral 101 denotes a frame; 102, 103, and 104 glass substrates to be an incident window or an output window; 105 a polarization splitting mirror; and 106 and 107 liquids. The glass substrate 104 is cemented to the auxiliary lens 53.

The space of a container formed by the frame 101, the glass substrates 102 to 104, and the polarization splitting mirror 105 is filled with the liquid 106 and 107. The liquid 106 and 107 and the structure of a multi-layer film of the polarization splitting mirror 105 are the same as those in the pre-polarizer 66 described with reference to FIG. 18. In the case of the polarizer-beam splitter 52, by forming a first dielectric multi-layer film and a second dielectric multi-layer film having different reflection wavelength bands of an S-polarized light component on both sides of the glass substrate of the polarization splitting mirror 105, the reflection wavelength band of S-polarized light can be widened as a whole. This enables satisfactory polarization splitting performance even in the case where the wavelength band of light incident upon the polarizer-beam splitter 52 is wide and in the case where there is some change in incident angle of incident light.

Next, the arrangement of the pre-polarizer 66 and the polarizer-beam splitter 52 will be described. The pre-polarizer 66 and the polarizer-beam splitter 52 are placed so that P-polarized light output from the pre-polarizer 66 is reflected by the polarizer-beam splitter 52 as S-polarized light. The reason for this is as follows.

In general, incident light spreads in a certain angle range with respect to the center of the optical axis, and the wavelength of incident light is not a single wavelength but has a certain range. Therefore, although it is relatively easy to allow reflectivity of S-polarized light to satisfy nearly 100% of the above-mentioned use condition of incident light, it is difficult to allow transmittance of P-polarized light to satisfy nearly 100% of the condition, (in particular, the incident angle dependence is large). Thus, since the reflected S-polarized light component contains a small amount of the P-polarized light component, it is preferred to take the P-polarized light component hardly containing the S-polarized light component in the pre-polarizer 66 which is required to cut an unnecessary polarized light component. Furthermore, the polarized light component incident upon the polarizer-beam splitter 52 is required to be introduced into the reflection light valve 51 efficiently, and reading light reflected by the reflection light valve 51 is required to be cut by the polarizer-beam splitter 52 in the case of a black display, so that the polarized light component incident upon the polarizer-beam splitter 52 is preferably S-polarized light having a reflection ratio of nearly 100%. By doing so, a projected image can be displayed with high contrast.

As shown in FIG. 19, S-polarized light 108 vertically incident upon the glass substrate 102 of the polarizer-beam splitter 52 passes through the liquid 106 and is incident upon the polarization splitting mirror 105 at an angle of 55.6°. S-polarized light 109 reflected by the polarization splitting mirror 105 passes through the liquid 106 and is output from the glass substrate 103 to the reflection light valve. Light reflected by the reflection light valve (not shown in FIG. 19) passes through the glass substrate 103 and the liquid 106 and is incident upon the polarization splitting mirror 105. Among light reflected by the reflection light valve, P-polarized light 110 which is modulated by the reflection light valve successively passes through the polarization splitting mirror 105, the liquid 107, the glass substrate 104, and the auxiliary lens 53, and is projected onto a screen as a projected image by the main lens group (not shown in FIG. 19). S-polarized light which is not modulated by the reflection light S valve is reflected to the glass substrate 102 by the polarization splitting mirror 105.

As shown in FIG. 16, the dichroic mirrors 56 and 57 and the polarizer-beam splitters 52a to 52c are placed in such a manner that an incident plane of the dichroic mirrors 56 and 57 (plane including the traveling direction of a light beam and the normal to the reflective faces of the dichroic mirrors 56 and 57) and an incident plane of the polarizer-beam splitters 52a to 52c (plane including the traveling direction of a light beam and the normal to the polarization splitting faces of the polarizer-beam splitters 52a to 52c) are perpendicular to each other. Thus, astigmatism generated in the polarization splitting mirror 105 of the polarizer-beam splitter 52 acts in a manner cancelling astigmatism generated in the dichroic mirrors 56 and 57.

The projection lens of the present invention has satisfactory telecentricity, and a principal ray incident upon the polarization splitting face of the polarizer-beam splitter is almost parallel with the optical axis.

Thus, polarization splitting performance hardly degrades due to the incident angle dependence of a light beam incident upon the polarization splitting face. Therefore, a projected image of high image quality can be displayed without causing the decrease in contrast and non-uniformity of the projected image due to the degradation of polarization splitting performance.

Color shading is not caused in the projection display apparatus 500, since substantially one projection lens is used in the projection display apparatus 500, as shown in FIG. 16. Furthermore, illuminating optical path lengths from the light source 61 to the reflection light valves 51a, 51b, and 51c corresponding to three colors are identical and the respective image centers of the reflection light valves 51a, 51b, and 51c are positioned on the optical axis of the projected lens, so that unevenness in color is hardly caused.

Focus adjustment of a projected image can be performed by combining and minutely moving the first lens group G1 and the second lens group G2 of the main lens group 58 along the optical axis direction. Focus adjustment using the third lens group G3 necessitates large movement of the third lens group G3, because the movement amount of a Gaussian image face is small with respect to the movement amount of the lens group. This causes an aberration balance to degrade. Thus, this focus adjustment by moving the third lens group G3 is not preferable.

Figure 20:
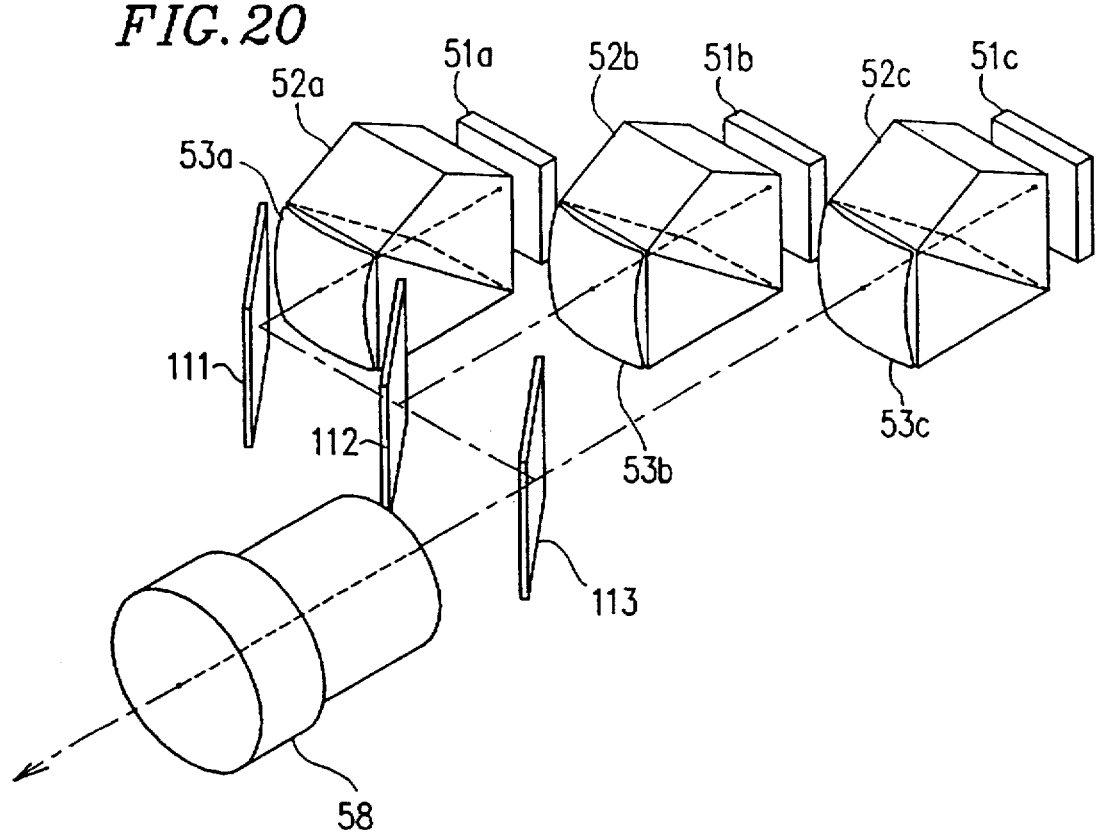
FIG. 20 is a perspective view showing a structure of a projection optical system of a projection display apparatus of another example according to the present invention.

In the projection lens 400 and the projection display apparatus 500 shown in FIGS. 15 and 16, the color combining optical system for combining three primary color light beams output from the three auxiliary lenses 53a, 53b, and 53c into one light beam is composed of two mirrors 54 and 55 and two dichroic mirrors 56 and 57. However, the color combining optical system is not limited to this structure. For example, as shown in FIG. 20, the color combining optical system can be composed of one mirror 111 and two dichroic mirrors 112 and 113.

In the above-mentioned examples, three CRTS, writing lenses, reflection light valves, polarizer-beam splitters, and auxiliary lenses are arranged in the horizontal direction of the screens of the CRTs. However, they can be arranged in the perpendicular direction of the screens of the CRTs.

In the above-mentioned examples, although a CRT is used as an image source, for example, a transmission type TFT liquid crystal panel can be used. In this case, the transmission type TFT liquid crystal panel can illuminated from behind by a light source such as a metal halide lamp, and an optical image formed on the liquid crystal panel in accordance with a video signal can be formed on the light conductive layer of the reflection light valve by the writing lens. An optical fiber used as an image guide can be used instead of the writing lens as a writing optical system.

Furthermore, in the present example, although the reflection light valve which modulates a polarization state of reading light in the liquid crystal layer in accordance with an image written in the light conductive layer is used, the present invention is not limited thereto. For example, any reflection optical elements forming an optical image from change in optical characteristics, such as those using a liquid crystal panel of another system and electrooptic crystal, can be used as a light valve.

As described above, according to the present invention, a projection lens which has a substantial back focus which is much longer compared with a focal length and realizes satisfactory aberration correction and high resolution is provided. Furthermore, according to the present invention, a projection display apparatus capable of displaying a projected image of high image quality and being constructed in compact size by using the projection lens is provided.

The projection lens of the present invention has sufficient space (back focus of a main lens group) capable of accommodating a color combining optical system (two dichroic mirrors and one or two plane mirrors) and a polarizer-beam splitter. Thus, the projection display apparatus using this projection lens is capable of magnifying and projecting an image on a screen by using substantially one projection lens. Furthermore, the projection display apparatus of the present invention readily adjusts convergence, is constructed in compact size, and realizes a projected image with high brightness and high image quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection lens comprising sequentially from a screen side:

a first lens group which has a negative power;

a second lens group which has a weaker power than that of the first lens group;

a third lens group which has a positive power;

a fourth lens group which has a positive power; and at least one transparent prism, wherein the fourth lens group is placed on the third lens group side of the transparent prism so as to be close to or in contact with the transparent prism.

2. A protection lens according to claim 1 satisfying the following conditions:

$$-1.7 \leq \frac{f_{G1}}{f} \leq -1.0 \quad (1)$$

$$-1.6 \leq \frac{f_{G1} f_{G2}}{f(f_{G1}+f_{G2})} \leq -1.1 \quad (2)$$

$$1.6 \leq \frac{d_{G2}}{f} \leq 2.1 \quad (3)$$

$$1.0 \leq \frac{d_{G3}}{f_{G4}} \leq 1.2 \quad (4)$$

where f is a combined focal length of an entire system, $f_{G1}$ is a focal length of the first lens group, $f_{G2}$ is a focal length of the second lens group, $f_{G4}$ is a focal length of the fourth lens group, $d_{G2}$ is an air interval between the second lens group and the third lens group, and $d_{G3}$ is an air interval between the third lens group and the fourth lens group.

3. A projection lens according to claim 1, wherein the first lens group includes sequentially from the screen side a negative meniscus lens having a convex face on the screen side and a negative lens having a concave face on an opposite side of the screen.

4. A projection lens according to claim 1, wherein the second lens group has a positive lens and a negative lens, and an Abbe number of the negative lens is smaller than an Abbe number of the positive lens.

5. A projection lens according to claim 1, wherein the second lens group is a cemented lens of a positive lens and a negative lens, and an Abbe number of the negative lens is smaller than an Abbe number of the positive lens.

6. A projection lens according to claim 1, wherein the third lens group includes a cemented lens.

7. A projection lens according to claim 1, wherein the third lens group includes sequentially from the screen side four lenses of a negative lens, a positive lens, a positive lens, and a positive lens.

8. A projection lens according to claim 1, wherein the fourth lens group is a planoconvex lens having a convex face on the screen side.

9. A projection lens according to claim 8, wherein the convex face of the planoconvex lens is aspherical.

10. A projection lens according to claim 1, wherein the fourth lens group is a planoconvex lens having a convex face on the screen side and a flat face cemented to the transparent prism.

11. A projection lens according to claim 1, wherein focus is adjusted by moving the first lens group and the second lens group in an optical axis direction, positions of the third lens group and the fourth lens group being fixed.

12. A projection lens according to claim 1, wherein a principal ray in the transparent prism is substantially parallel with an optical axis of the fourth lens group.

13. A projection lens according to claim 1 satisfying the following condition:

$$4.0 \leq \frac{(d_{G3}+d_P)}{f} \leq 5.0 \quad (5)$$

where f is a combined focal length of an entire system, $d_{G3}$ is an air interval between the third lens group and the fourth lens group, and $d_P$ is a reduced optical path length scaled in the air of the transparent prism in an optical axis direction.

14. A projection lens according to claim 1, wherein the transparent prism is a polarizer-beam splitter provided with a polarization splitting face.

15. A projection lens according to claim 1, wherein one plane mirror is placed in space between the second lens group and the third lens group.

16. A projection lens comprising:

a main lens group including sequentially from a screen side a first lens group which has a negative power, a second lens group which has a weaker power than that of the first lens group, and a third lens group which has a positive power;

three auxiliary lenses which have identical optical characteristics and a positive power;

three polarizer-beam splitters which are transparent prisms, the three auxiliary lenses being respectively positioned close to or cemented to faces of the corresponding polarizer-beam splitters on a side of the third lens group;

two dichroic mirrors; and at least one plane mirror, wherein light beams output from the three polarizer-beam splitters are incident upon the corresponding three auxiliary lenses;

light beams output from the three auxiliary lenses are combined to one light beam by the at least one mirror and the two dichroic mirrors, the combined light beam being incident upon the main lens group; and wherein three systems from the main lens group to the three auxiliary lenses respectively have predetermined image forming characteristics.

17. A projection lens according to claim 16 satisfying the following conditions:

$$-1.7 \leq \frac{f_{G1}}{f} \leq -1.0 \quad (1)$$

$$-1.6 \leq \frac{f_{G1}f_{G2}}{f(f_{G1}+f_{G2})} \leq -1.1 \quad (2)$$

$$1.6 \leq \frac{d_{G2}}{f} \leq 2.1 \quad (3)$$

$$1.0 \leq \frac{d_{G3}}{f_{G4}} \leq 1.2 \quad (4)$$

where f is a combined focal length of an entire system, $f_{G1}$ is a focal length of the first lens group, $f_{G2}$ is a focal length of the second lens group, $f_{G4}$ is a focal length of the auxiliary lenses, $d_{G2}$ is an air interval between the second lens group and the third lens group, and $d_{G3}$ is an air interval between the third lens group and the auxiliary lenses.

18. A projection lens according to claim 16, wherein the main lens group, the three auxiliary lenses, the three polarizer-beam splitters, the two dichroic mirrors, and the at least one plane mirror are accommodated in one container.

19. A projection lens according to claim 16, wherein each reflective face of the two dichroic mirrors is parallel with each reflective face of the at least one plane mirror.

20. A projection lens according to claim 16, wherein each optical axis of the three auxiliary lenses is in an identical plane.

21. A projection lens according to claim 20, wherein each optical axis of the three auxiliary lenses is parallel with each other.

22. A projection lens according to claim 16, wherein each polarization splitting face of the three polarizer-beam splitters is parallel with each other.

23. A projection lens according to claim 16, wherein light beams incident upon the three polarizer-beam splitters are S-polarized light beams.

24. A projection lens according to claim 16, wherein the polarizer-beam splitter includes:

a frame;

a plurality of transparent substrates to be an incident window and an output window;

transparent liquid provided in a container which is formed including the frame and the plurality of transparent substrates; and a polarization splitting face positioned in the transparent liquid, wherein the polarization splitting face has a dielectric multi-layer film formed on a transparent plate.

25. A projection lens according to claim 24, wherein a main component of the transparent liquid is ethylene glycol.

26. A projection display apparatus comprising:

a light source for radiating reading light containing three primary color components;

color separation means for separating the reading light radiated from the light source into three primary color beams;

three reflection light valves; and a projection lens having: a main lens group including sequentially from a screen side a first lens group which has a negative power, a second lens group which has a weaker power than that of the first lens group, and a third lens group which has a positive power; three auxiliary lenses which have identical characteristics and a positive power; three polarizer-beam splitters which are transparent prisms, the three auxiliary lenses being respectively positioned close to or cemented to faces of the polarizer-beam splitters on a side of the third lens group; two dichroic mirrors; and at least one plane mirror; and three light writing means for forming an optical image on each of the reflection light valves, wherein the three primary color light beams output from the color separation means are incident upon the corresponding reflection light valves through the three polarizer-beam splitters of the projection lens, light beams reflected by each of the reflection light valves are incident upon the corresponding auxiliary lenses through the corresponding polarizer-beam splitters, and light beams output from the three auxiliary lenses are combined into one light beam by the at least one plane mirror and the two dichroic mirrors and incident upon the main lens group, whereby optical images formed on the reflection light valves are projected on the screen by the light write means.

27. A projection display apparatus according to claim 26 satisfying the following conditions:

$$-1.7 \leq \frac{f_{G1}}{f} \leq -1.0 \quad (1)$$

$$-1.6 \leq \frac{f_{G1}f_{G2}}{f(f_{G1}+f_{G2})} \leq -1.1 \quad (2)$$

$$1.6 \leq \frac{d_{G2}}{f} \leq 2.1 \quad (3)$$

$$1.0 \leq \frac{d_{G3}}{f_{G4}} \leq 1.2 \quad (4)$$

where f is a combined focal length of an entire system, $f_{G1}$ is a focal length of the first lens group, $f_{G2}$ is a focal length of the second lens group, $f_{G4}$ is a focal length of the auxiliary lenses, $d_{G2}$ is an air interval between the second lens group and the third lens group, and $d_{G3}$ is an air interval between the third lens group and the auxiliary lenses.

28. A projection display apparatus according to claim 26, comprising at least one pre-polarizer placed in an optical path from the light source to the polarizer-beam splitter in such a manner that illuminance of light output from the pre-polarizer becomes substantially maximum on the reflection light valves.

29. A projection display apparatus according to claim 26, comprising three pre-polarizers placed in an optical path from the color separation means to the polarizer-beam splitter in such a manner that illuminance of light output from each of the pre-polarizers becomes substantially maximum on the corresponding reflection light valves.

30. A projection display apparatus according to claim 28, wherein the pre-polarizer is a transparent prism including;

a frame, two transparent substrates to be an incident window and an output window;

transparent liquid provided in a container which is formed including the frame and the two transparent substrates;

at least one polarization splitting face placed in the transparent liquid and having a dielectric multi-layer film formed on a transparent plate; and at least one plane mirror placed in the transparent liquid.

31. A projection display apparatus according to claim 29, wherein the pre-polarizer is a transparent prism including;

a frame, two transparent substrates to be an incident window and an output window;

transparent liquid provided in a container which is formed including the frame and the two transparent substrates;

at least one polarization splitting face placed in the transparent liquid and having a dielectric multi-layer film formed on a transparent plate; and at least one plane mirror placed in the transparent liquid.

32. A projection display apparatus according to claim 30, wherein a main component of the transparent liquid is ethylene glycol.

33. A projection display apparatus according to claim 30, wherein the pre-polarizer includes two polarization splitting faces and two plane mirrors, and the polarization splitting faces and the plane mirrors are placed so as to be symmetrical with each other with respect to an optical axis of light output from the light source.

34. A projection display apparatus according to claim 30, wherein, in the pre-polarizer, the polarization splitting faces reflect a predetermined polarized light component among light incident thereupon, the plane mirrors reflect the reflected polarized light component, and the polarization splitting faces further reflect the polarized light component reflected by the plane mirrors, whereby the reflected polarized light component travels toward a direction from which the incident light is incident.

35. A projection display apparatus according to claim 26, wherein the polarizer-beam splitter includes:

a frame;

a plurality of transparent substrates to be an incident window and an output window;

transparent liquid provided in a container which is formed including the frame and the plurality of transparent substrates; and a polarization splitting face positioned in the transparent liquid.

wherein the polarization splitting face has a dielectric multi-layer film formed on a transparent plate.

36. A projection display apparatus according to claim 35, wherein a main component of the transparent liquid is ethylene glycol.

37. A projection display apparatus according to claim 26, wherein the pre-polarizer and the polarizer-beam splitter are placed so that linear polarized light output from the pre-polarizer is incident upon the polarizer-beam splitter as S-polarized light.

38. A projection display apparatus according to claim 26, wherein the reflection light valve includes a transparent electrode, a light conductive layer, a light reflective layer, and a light modulation layer, and the light modulation layer has polarization characteristics which change in accordance with an illuminance distribution of an image written in the light conductive layer.

39. A projection display apparatus according to claim 38, wherein a material of the light modulation layer is liquid crystal, and the light modulation layer forms an optical image by modulating a polarization state of incident light.

40. A projection display apparatus according to claim 26, wherein the light writing means includes image forming means, and image transfer means for imaging an optical image formed on the image forming means onto the reflection light valves.

41. A projection display apparatus according to claim 26, wherein each optical axis of the three auxiliary lenses, the three reflection light valves, and the three light write means is in an identical plane and is parallel with each other, and each polarization splitting face of the three polarizer-beam splitters is parallel with each other.

* * * * *